United States Patent
Krishnaiah et al.

(10) Patent No.: US 12,028,274 B1
(45) Date of Patent: Jul. 2, 2024

(54) SYSTEMS AND METHODS FOR FACILITATING THE CONTROL AND MANAGEMENT OF CLOUD USAGE COSTS INCURRED BY CLOUD ACCOUNTS FOR USING CLOUD RESOURCES OF A CLOUD SERVICE

(71) Applicants: Venkatesh Kumar Krishnaiah, Chantilly, VA (US); Varsha Venkatesh, Chantilly, VA (US)

(72) Inventors: Venkatesh Kumar Krishnaiah, Chantilly, VA (US); Varsha Venkatesh, Chantilly, VA (US)

( * ) Notice: Subject to any disclaimer, the term of this patent is extended or adjusted under 35 U.S.C. 154(b) by 0 days.

(21) Appl. No.: 18/298,177

(22) Filed: Apr. 10, 2023

Related U.S. Application Data

(63) Continuation-in-part of application No. PCT/US2021/048091, filed on Aug. 27, 2021.

(60) Provisional application No. 63/230,416, filed on Aug. 6, 2021.

(51) Int. Cl.
*H04L 47/70* (2022.01)
*H04L 47/78* (2022.01)

(52) U.S. Cl.
CPC .......... *H04L 47/823* (2013.01); *H04L 47/781* (2013.01); *H04L 47/822* (2013.01)

(58) Field of Classification Search
CPC .... H04L 47/823; H04L 47/781; H04L 47/822
See application file for complete search history.

(56) References Cited

U.S. PATENT DOCUMENTS

| | | | |
|---|---|---|---|
| 2010/0050172 A1* | 2/2010 | Ferris | G06F 9/4856 718/1 |
| 2011/0313902 A1 | 12/2011 | Liu et al. | |
| 2012/0101952 A1 | 4/2012 | Raleigh et al. | |
| 2012/0124211 A1* | 5/2012 | Kampas | H04L 47/80 709/226 |
| 2015/0067171 A1* | 3/2015 | Yum | H04L 67/562 709/226 |
| 2016/0034835 A1* | 2/2016 | Levi | H04L 67/10 705/7.23 |
| 2018/0077029 A1 | 3/2018 | Mittal et al. | |
| 2019/0317821 A1 | 10/2019 | O'Neal et al. | |
| 2020/0073717 A1 | 3/2020 | Hari | |

(Continued)

OTHER PUBLICATIONS

"Breaking Down the Cost of Cloud Computing in 2023", retrieved from the internet retrieved on Apr. 6, 2023; <URL: https://www.techtarget.com/whatis/Breaking-Down-the-Cost-of-Cloud-Computing>.

(Continued)

*Primary Examiner* — Farzana B Huq

(57) ABSTRACT

A method for facilitating the control and management of cloud usage costs incurred by cloud accounts for using cloud resources of a cloud service. The method comprises receiving account information from a device, analyzing the account information, determining cloud usage cost incurred by a cloud account based on the analyzing, comparing the cloud usage cost with a usage cost criterion based on the determining, generating a cloud account controlling command for restricting a usage of the cloud resources by the cloud account based on the comparing, transmitting the cloud account controlling command to a cloud service provider device, and storing the account information.

14 Claims, 16 Drawing Sheets

(56) References Cited

U.S. PATENT DOCUMENTS

2021/0044540 A1    2/2021    Rushton et al.
2021/0099363 A1    4/2021    Leemet et al.

OTHER PUBLICATIONS

"Multi-Cloud Budgeting and Chargeback in Xi Beam" retrieved from the internet retrieved on Apr. 6, 2023; <URL: https://www.nutanix.com/blog/multi-cloud-chargeback-budgeting>.

"How to Manage and Optimize Costs of Public Cloud IaaS and PaaS" retrieved from the internet, retrieved on Apr. 6, 2023; <URL: https://www.gartner.com/en/documents/3982411>.

"Overview" retrieved from the internet, retrieved on Apr. 6, 2023; <URL: https://www.fingent.com/usecases/artificial-intelligence-for-faster-project-cost-estimation/>.

\* cited by examiner

SYSTEMS AND METHODS FOR FACILITATING THE CONTROL AND MANAGEMENT OF CLOUD USAGE COSTS INCURRED BY CLOUD ACCOUNTS FOR USING CLOUD RESOURCES OF A CLOUD SERVICE

FIELD OF THE INVENTION

Generally, the present disclosure relates to the field of data processing. More specifically, the present disclosure relates to systems and methods for facilitating controlling and managing cloud usage costs incurred by cloud accounts for using cloud resources of a cloud server.

BACKGROUND OF THE INVENTION

Data processing and cloud computing are technologically important to several industries, business organizations, and/or individuals. Cloud computing has been a modern revolutionary ecosystem. Many enterprises have migrated to cloud computing to reduce on-premise data center footprint and to avoid maintenance nightmares and management. However, there are various drawbacks with cloud computing. For example, it is easy to provision any size and/or oversized resources and/or spin multiple stacks on a cloud service with no control over spending on the cloud resources. This can result in a financial nightmare to sustain the funds allocated for that financial year or on fixed price budget projects.

Maintaining budget control on several accounts, projects, and/or products across multiple cloud services is an operational overhead and/or loss of control. Cloud budget control is a complicated process to manage and maintain across multiple projects, accounts or subscriptions, and multiple cloud vendors. The need to track, control, and manage the cloud usage costs on each stage of the project or product development and operation maintenance is crucial to meet cost on the allocated budget. Therefore, there is a need for methods, systems, apparatuses, and devices for facilitating controlling and managing cloud usage costs incurred by cloud accounts for using cloud resources of a cloud that may overcome one or more of the above-mentioned problems and/or limitations.

SUMMARY OF THE INVENTION

Disclosed herein is a system and a method for facilitating controlling and managing cloud usage costs incurred by cloud accounts for using cloud resources of a cloud service. The method may include a step of receiving, using a communication device, account information associated with one or more cloud accounts managed by a cloud server. Further, the method may include a step of analyzing, using a processing device, the account information. Further, the method may include a step of determining, using the processing device, cloud usage cost incurred by the one or more cloud accounts based on the analysis. Further, the method may include a step of comparing, using the processing device, the cloud usage cost with cloud usage cost criterion associated with the one or more cloud accounts based on the calculation of the cloud usage cost. Further, the method may include a step of generating, using the processing device, one or more cloud account controlling commands for restricting the usage of the cloud resources by the one or more cloud accounts based on the comparison. Further, the method may include a step of transmitting, using the communication device, the one or more cloud account controlling commands to one or more cloud service provider devices associated with at least one cloud service provider. Further, the one or more service provider devices restrict the usage of the cloud resources by the one or more cloud accounts based on the one or more cloud account controlling commands. Further, the method may include a step of storing, using a storage device, the account information.

The system may include a communication device, a processing device, and a storage device. Further, the communication device may be configured for performing a step of receiving account information associated with one or more cloud accounts managed by the cloud server. Further, the communication device may be configured for performing a step of transmitting one or more cloud account controlling commands to one or more cloud service provider devices associated with at least one cloud service provider. The processing device may be communicatively coupled with the communication device. Further, the processing device may be configured for performing a step of analyzing the account information. Further, the processing device may be configured for performing a step of determining cloud usage cost incurred by the one or more cloud accounts based on the analysis. Further, the processing device may be configured for performing a step of comparing the cloud usage cost with the cloud usage cost criterion associated with the one or more cloud accounts based on the calculation of the cloud usage cost. Further, the processing device may be configured for performing a step of generating the one or more cloud account controlling commands for restricting a usage of the cloud resources by the one or more cloud accounts based on the comparison. The storage device may be communicatively coupled with the processing device. Further, the storage device may be configured for performing a step of storing the account information.

DETAILED DESCRIPTION OF THE INVENTION

Figure 1:
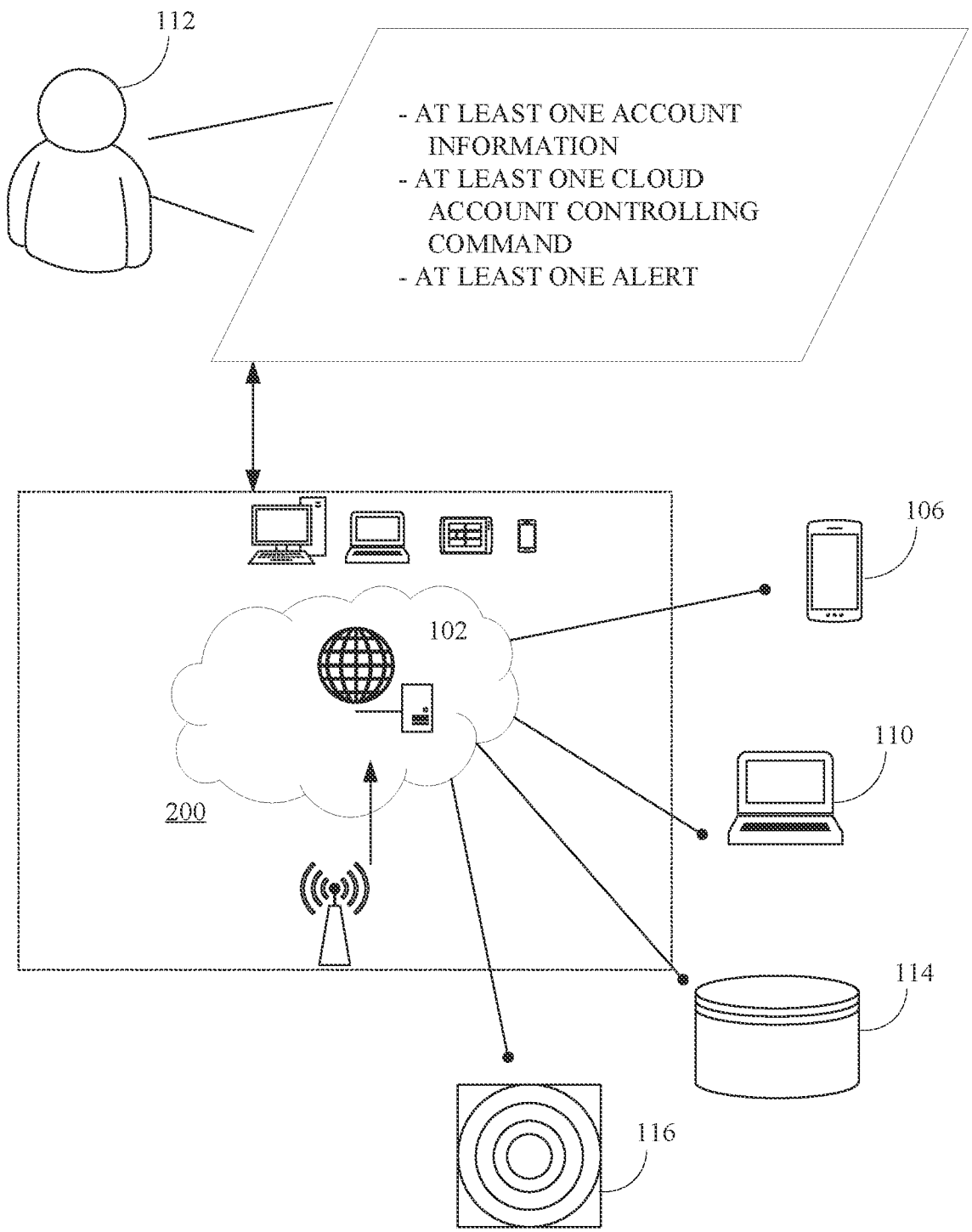
FIG. 1 is an illustration of an online platform consistent with various embodiments of the present disclosure.

All illustrations of the drawings are for the purpose of describing selected versions of the present invention and are not intended to limit the scope of the present invention.

The present disclosure describes a system and a method for facilitating controlling and managing cloud usage costs incurred by cloud accounts for using cloud resources of a cloud server. The disclosed system may include a centralized cloud usage-cost control management system of setting up one or more cloud account budgets, controlling and monitoring the usage cost, limiting resource usage by a given threshold, and facilitating Information Technology (IT) cloud budget planning. The disclosed system may be configured to control multiple cloud account budgets across multiple cloud providers interactively over the defined period from a centralized interface. The disclosed system may be configured to set up the allocated budget for the cloud account for a given period or financial year set by the enterprise budget team. The System monitors the budget and controls the cloud usage cost to help the organization manage cloud usage costs on the allocated budget for the given period or execute fixed price cloud usage-cost projects. The System monitors monthly usage costs and sends alerts to the administrator and/or product owner if the usage costs exceed threshold levels on the cloud usage cost.

Further, the disclosed system may be configured to control the cloud usage cost not to initiate cloud resources unless account usage cost is brought back to below threshold levels or overriding set thresholds by adding funds or exceptions. Further, the disclosed system may be configured to provide Artificial Intelligence (AI)/Machine Learning (ML) based budget estimation for any given period or fiscal year based on similar workloads and/or enterprise historical usage-cost data. This estimation is used for IT cloud budget planning, forecast cloud usage costs, and cloud cost and budget management across cloud accounts. Further, the disclosed system may be configured to generate various reports on the show back and/or chargeback, IT cloud budget planning, budget planner, AI-based multi-cloud cost savings recommendation, etc.

Further, the disclosed system may be associated with a centralized cloud budget planner. The disclosed system may be associated with a unified management console to plan, manage, and control cloud usage cost spending of product or cloud applications from development to Operation and Maintenance (O&M). The disclosed system is configurable to set up multi-level budget thresholds and alerts across all the cloud accounts to notify if the set budget cost reached the threshold on any given period. Suppose the set budget reached a critical threshold. In that case, the system restricts to spin more cloud resources in that cloud account or subscription unless terminating the existing resources, which are already influencing usage cost to bring below the set critical threshold level for that period. Cloud usage costs may surge beyond the allocated budget threshold for various reasons. Developers or application teams run multiple environments without shutting down unwanted environments or run numerous test resources or spin oversized resources, or maybe forgotten resources. These unwanted resources may ramp up the usage cost, preventing recovery of the metered cost, which impacts project execution, deliverables, and creates funding chaos.

Further, the disclosed system may be configured to allow overriding the budget amount during any given period due to changes in application design or requirements or funding or any negations to override the critical threshold point, allowing the reset to new threshold levels. If a project or product requires restructuring the whole budget based on the application design changes, the system may reconfigure the budget at any time.

Further, the disclosed system may be configured to plan, manage, and control the allocated budget for the project or product cloud accounts and maintain the applications over the multi-cloud infrastructure ecosystem. Further, the disclosed system may be configured to collect all the organization's cloud accounts from the different cloud providers' master/payer account, classifies the organizational accounts based on the Cloud Service Providers (CSP), and associates the product or project information with the accounts, and maps the associated charge code. Through a unified console, the disclosed system may be configured to create a budget plan for an account, manage a budget plan, and create new budget plan for the entire portfolio of cloud accounts for a given period or fiscal year. Budget and cost control systems can be implemented on any virtual machine, server, or provided as software as a service from remote server as managed service. The system has a unified interface to log in and manage the entire enterprise multi-cloud accounts, cost control, and budget planning system. The unified interface console can be accessed through an Internet web browser from a computer device, mobile phone, tablet, or any device with a compatible internet web browser.

Before access to the system, a user may log in to the system through a unified interface. As discussed before, administrative (admin) users, finance users, cloud infrastructure users, project/product/application users, or any stakeholder users can access the system. By default, one admin user exists for the initial system setup and configuration. The system allows a different type of user access to be created based on the duties as per information technology data security industry standard requirements. The system allows categorizing the users by admin, technical, and viewer, based on the access type that the individual access policies are attached to the different users. Admin users can access and set all the system-level configurations, page default, field default values, drop-down lists, data feed, cloud cross-account access, configure budget data, create users, and reset user passwords. Admin users also have all other users' permissions by default. Technical users can add, edit, updated cloud accounts, set up a budget for an account, data feed, budget planner for the given period or fiscal year, report, and dashboard. The viewer user can view the shared dashboard, generate the reports, search and view cloud-account information and budget information.

To set up a budget and/or budget planning or cost control for a cloud account, at least one cloud account, related business product/project information, and cloud vendor or reseller information should exist. First, cloud service provider, vendor, or reseller information is collected before importing respective cloud accounts and enterprise product information. The system allows capturing cloud service provider, vendor, or reseller information. The required vendor information is captured and can include, but is not limited to, vendor-name, contract period, contract number, service provider, task, scope, markup, admin fees, discount, credits, and status. This vendor information is automatically mapped to the vendor's name associated with the cloud accounts. If captured vendor details from the cloud account do not have the correct information, the system enables a manual mapping of the vendor information. This manual mapping takes precedence over automapping.

Cloud account information may be captured by manually entering each account information through the cloud account information entry page or by bulk import interface. Required cloud-account information is captured and can include, but is not limited to, account number, account-name, account-status, cloud service provider, vendor/reseller name, creation date, organization group, and join method. For bulk account information, imports can be uploaded through Comma-Separated Values (CSV) format files. This bulk account information is retrieved and exported from resellers' master or payer accounts or can be created manually in a CSV format. If an account is already present during bulk account import, those accounts are not imported, and the system creates a rejected duplicate list for further review.

Most organizations have a broader Business Product Components classification to view the budget and IT spending by business area, components, portfolio, product, product line, cyber identification (ID), etc. The system also allows to input organization-specific bulk product information import via CSV format. The system captures enterprise-specific business product information through the product information entry page. The required product/project information is captured and can include, but is not limited to, project ID, Project, business area, business unit, portfolio, product line, product owner, master system technical lead, cost center, etc. These system field names are dynamically configurable to align with enterprise or agency-specific business field names or naming standards through admin login. Once the accounts and business product information are captured in the system, the system automatically maps the product name associated with the cloud account using the account name. For example, when the cloud account name is not aligned with the business product name or any changes in the business-naming conventions, the system allows manually mapping of the product name to account ID. Manual mapping overrides auto mapping to avoid ambiguity.

Further, the system allows input of any vendor's markups, administration fee, discounts, and credits associated and/or negotiated from the vendor, reseller, or cloud service provider. These fees, discounts, and credits are part of budget formulation on top of cloud service provider usage costs. To accurately forecast budget planning and monitoring budget burndown rate, the system allows vendor fees and discounts to be included in part of budget planning and cost control on cloud accounts. By enabling markup, discounts, and credits as part of the budget formulation, the system accurately tracks the organization's cloud IT spending.

Further, the system has the feature to normalize the billing and utilize the data to remove duplicate tags, misspelled tags, assign missing tags to categorize, resources grouping, resource automation, security management, resource triggers, alerts, group products, and map the resources to product or project the resources belong to. This feature aligns with organization resource tag classification if there are any misaligned or untagged tags resources to track accurate budget and cost tracking. Further, the disclosed system may be configured to allow adding additional tags to track by environment, vendor, external/internal, etc., to help track budget spending by the environment, vendor, external/internal, etc. Further, the disclosed system may be configured to allow to enter tag-mapping manually or bulk upload through to a tag and mapping interface.

Advanced charge code mapping allows tracking the budget and burns rate of the product or project by the project, environment, phases, and releases by weekly, monthly, yearly, and even by Agile Sprints levels. These financial reports are also to be used for the show back or chargeback. Further, the disclosed system may be configured to allow entering the organization specific charge code through the chargeback interface. The required charge code information is captured and can include, but is not limited to, project name, program name, account, start date, end date, etc.

After capturing cloud accounts, vendor information, and product information, the system is ready to create a budget for the cloud accounts and/or generate a budget plan for any given period. The system allows the creation of a budget for an account for a given period and/or create a budget plan for a given period or fiscal year. To create a budget for an account, an account from the existing account list is chosen and budget details are entered including, but not limited to, start date, end date, allocated or computed budget amount for the period, warning threshold, and critical threshold. Once all required budget information is entered, the system may generate a monthly budget plan for the account before pushing the budget information relevant to the cloud service provider account. The budget is validated and submitted to enforce the budget governance on that cloud account. Once the budget is submitted, the system may generate a schedule via the budget scheduler module to push the budget schedule to the respective cloud account. On the cloud account side, once the cloud account receives new or changes in the budget schedule, the serverless budget governance agent may execute the budget schedule and set all required budget parameters to that cloud account. After successful budget governance is set to the account, the agent validates and sends the budget status back to the budget and cost control system to make sure the budget values set at the cloud account align with the budget values set on the system. After receiving the status, the budget scheduler validates the feedback received from the cloud account versus the budget schedule in the system. If there is any misalignment from the budget set at the cloud account, the budget scheduler engine pushes the schedule again. The schedule engine tries several times before raising the deviation or error notice at the panel or in the schedule status report. If the budget schedule engine does not receive feedback from the cloud account, the schedule engine tries multiple times before raising an alert or notice at the interface panel and marks that budget as failed to set.

Once the budget is set, the schedule engine periodically pulls the budget information from all the cloud accounts to make sure the budget information aligns with the budget set in the system. If any deviation is found, the budget scheduler pushes the schedule to that account to align with a set value. If there is any budget information access issue from the cloud account, the system sends alerts and generates an error report for validation and auditing purposes. This validation process helps to identify any changes in the cloud component, network-related issues, any deviation or manipulated budget at an account level, compromised account, or policy changes that caused budget and cost control to break. Any component or service may break due to the dynamic nature of the cloud service provider's managed resources, services, and/or any changes that occurred at the infrastructure level. Deviation from the budget set at the system compared to account-level budget due to manipulation or compromised cloud account can also be identified.

Further, the budget and cost control system allow configuring two levels of thresholds based on control preference. For example, the warning threshold can be set to send warning alerts on the budget amount spent. The critical threshold can be set to send a critical alert on the budget amount spent. An add-on feature on the critical threshold setting restricts the spin of more resources to control the cost until the usage cost consumption goes below the set critical threshold value. This feature is more beneficial for the development environment to keep cost control on the projected budget burn rate on the allocated funds. For example, if a warning threshold is set at 70% on the allocated account budget, the system sends the warning alert to the respective team when the usage hits 70%. If a critical threshold is set at 90% on the allocated account budget, a critical alert is sent when the usage hits 90%. Suppose the critical threshold along with the resource restrict feature is enabled. In that case, the system sends a critical alert and stops spinning more resources on that account to control the cost until the usage cost consumption goes below the set critical threshold value.

Further, the system allows changing the budget which has been already created or in place for any changes in the project funding, budget schedules, and architectural changes that affect the usage cost and override the critical threshold for the given period. If there are any changes in the project funding or budget, the system allows updating the new amount on the existing budget. If there is a change in the schedule and the amount, the system enables makes those changes, and those updated budget schedules are pushed to the appropriate account. One of the system's main features is to enter override amount on the critical threshold that has been triggered. For example, a critical alert triggered when budget burn-rate reaches 90% of the monthly set budget, the cloud account is restricted from spinning more resources. In this scenario, the system allows overriding the budget amount by adding the budget amount for that month. This feature avoids a deadlock scenario on the cloud account to override resource spin restriction. There are several common scenarios in the development environment to spin more resources than required which are not anticipated during the project planning and design phase. Here are a few scenarios that burn up the allocated monthly budget: (1) underestimating resource or capacity needed during the design phase, (2) forgetting resources that are not noticed, which are being charged, and consume the allocated budget, (3) spinning oversized resources than required for testing purposes, and (4) creating too many test resources and/or resource stacks that are not shut down and are not required.

Further, the disclosed system may be configured to allow the creation of a budget planner for the fiscal year or any given period. This budget planner monitors budget burndown cost, sends threshold alerts, controls cloud usage cost, and also restricts the cloud account to not allow more resource bring up to avoid usage cost beyond the allocated budget. In the system, budget planning can be created in three methods, namely, (1) creating a budget plan for an individual account through a budget planning interface, (2) creating a new budget plan from the previously existing budget year/period plan, or (3) creating a new budget plan through a bulk upload through CSV format for the entire or part of all the cloud accounts. The second method may include creating a new budget plan from the previously existing budget year/period plan through the budget planner interface page. By entering the new start and end dates for all accounts, the system allows selectively to change dates and other values like threshold, the budget amount, and so on for individual accounts. Once the new budget plan is published, the system enables to save and/or save and publish. The new budget is active based on the start and end dates mentioned in the plan. Further, the third method may include creating a new AI-based forecasted budget estimation plan based on historical or last year's cost consumption through the budget planner interface page. By entering the new start and end dates for all accounts, the system allows to selectively change dates and other values like threshold, the budget amount, and so on for individual accounts. Once the new AI-based forecasted budget plan is updated, the system enables to save and/or save and publish. The new budgeting is active based on the start and end dates mentioned in the plan.

Further, in an embodiment, the disclosed system may be configured to upload the bulk budget plan through CSV format for all cloud accounts or some cloud accounts. The existing budget for all cloud accounts is exported in CSV format. Then, the exported file is opened, and the new start and end dates are edited as well as threshold percentage, the budget amount, and other values for the cloud accounts. The updated budget file is then imported into the system publish the new budget. Further, in an embodiment, the disclosed system may be configured to create a budget plan in the CSV file for the cloud accounts that needs to control budget and usage costs. To create a bulk budget plan for the cloud accounts, the cloud-account numbers and budget details are entered including, but not limited to, start date, end date, allocated budget amount for the period, warning-threshold in percentage, and critical-threshold in percentage. The newly created CSV file is the uploaded to the system and saved before publishing the Budget. Furthermore, the system generates various finance, show back/chargeback, and IT budget plan reports, which play a crucial role in IT planning, cloud IT cost distribution, cloud infrastructure cost of ownership, and auditing. The system uses a ML algorithm to generate AI-based budget estimates for the next budget based on the usage cost consumption year.

Regarding cloud IT budget planning, analysts and managers have to reach out to various teams to pull the historical cloud usage-cost data for Total Cost of Ownership (TCO) analysis for the cloud IT planning. Capacity and forecast estimation needs to be calculated for the application or project to compute accurate IT budget formulation. These calculations are often manual which can be time and resource consuming. To avoid this, the disclosed system may be configured to eliminate all these manual processes by providing AI-based budget estimate recommendations. The system also provides the provision to include markups, discounts, and credits from vendors and/or cloud resellers. This allows the system to provide the exact budget estimate recommendations required for the given period. In addition to AI-based budget estimate recommendations, the system can automatically generate cloud account budget estimation, forecasting, and planning for the next budget period or fiscal year. The engine for the AI-based budget estimate recommendations can be built using commercially available FedRAMP-compliant fully managed services offered by cloud service providers or third-party vendors. Further, AI estimation services can utilize one or models generated using different methods including, but not limited to, machine learning, deep learning, predictive analytics, natural language processing, and intelligent data discovery. The different models for cost forecasting can be tuned from historical usage-cost data captured by the system on the cloud accounts. The system computes the data generated by the AI estimation service to provide budget estimation forecast recommendations for the given period or next budget cycle. Further, the disclosed system may be configured to generate several reports using the report and analytical engine. Using an analytical engine, the user can create and interact with visuals and tell data-driven stories. Some data points represent a significant event, and others represent a random occurrence. The analysis uncovers which data is worth investigating, based on what driving factors (key drivers) contributed to the event.

Further, the system has several cloud cost control features to control the cloud usage cost within the allocated fixed budget that the users can set through a unified cost control interface. This feature enables the organization to control the cost of fixed budget projects, applications, or services within the allocated funds. This cost management feature also enables control of cloud usage costs within the allocated or available budget and shuts down the cloud resources when not necessary. This unified interface eliminates the tedious job of logging into individual accounts and manually shutdown resources across multiple clouds to stop cloud resources to save on usage-cost. Using this unified interface, users can set or change the budget, budgeting period for the project/application, dynamically change the startup, and selectively shut down the any cloud resources based on the enterprise working hours, service level requirements (SLAs), or stop the resources as necessary.

Further, the main feature of the system is to remotely control usage costs by throttling endpoints on how much the enterprise wants to spend the funds or budget on a given period to provide services. This feature enables the organization to control how much customers can utilize the enterprise contents and/or services without hogging the application bandwidth nor interrupting other customers who want to use the same services and not to bring down the entire application. This handy feature for the organization enables control over funds and throttle the data miners on publicly disseminated information like historical labor statistics data, census data, research and national archives data, patent and trademark data, media content delivery, bulk download contents, etc.

The system also has an integrated visualization dashboard. The visualization dashboard is a graphical representation of data. A dashboard is a read-only snapshot of an analysis to share with other users for reporting purposes. A dashboard preserves the analysis configuration at the time of publishing, including filtering, parameters, controls, and sort order. The data used for the analysis is dynamic, and visualization dashboard reflects the current data in the data sets used by the analysis. The system visualization dashboard consists of several visualization pages with associated reports. Some of the reports include, but are not limited to, billing summary, tagged/untagged services usage cost, budget monitoring, AI-based anomaly detection, AI-based forecast, and AI-based multi-cloud, multi-account savings plan recommendation.

The billing summary includes a summary of consolidated cloud usage-cost in an organization level which shows usage-cost by account, associated project, and product as well as any chargeback over the selected period. Tagged/untagged services usage cost shows the usage of the different environments by accounts, by services with tags, or by untagged cloud resources (system, environment, business area, etc.). Budget monitoring includes high-level view of monitoring accounts usage by comparing with monthly budget allocated per account. The visuals show the comparison between the actual usage cost of an account versus the budget amount allocated to the account monthly. AI-based anomaly detection shows the outliers, spikes, or deviations in the usage cost or budget that falls outside a distribution pattern. Anomaly detection identifies the causations and correlations to enable users to make data-driven decisions. AI-based forecast shows key business metrics that are the costs for a forward period, which can be configured as per the requirement. Analytics insight is quick data interpretation that gives a high-level takeaway from the visuals the system creates. These insights enable the user to perform any computation, using customized wordings to provide context to the fields. AI-based multi-cloud, multi-account savings plan recommendation includes the most frequently used instance utilization types across all the cloud accounts breakdown by product/portfolio. These statistics help the organization to generate purchase saving plan/reserved instance recommendations for targeted cloud resources like instances and RDS. This helps in potential savings on on-demand multi-cloud resources costs which are 30% to 70% higher than those of reserved instance purchases. Using these explorative analytics, the user can perform deep-dive analysis by drilling down to specific cloud resources, pricing, and other specifications. This offers the ability to monitor budget control, cost savings, and optimization. This also provides the flexibility in cost comparison between multi-clouds for long term investments and savings plan. Further, the disclosed system may be integrated with an enterprise active directory to set up email notifications. The disclosed system may be configured to send email notifications and alerts to various users and teams such as sending the budget summary alert, soft and hard cap threshold alerts, burn-rate alerts, monthly finance reports, executive reports, etc.

As can be seen in FIG. 1, the online platform 100 enables facilitating controlling and managing cloud usage costs incurred by cloud accounts for using cloud resources of a cloud may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform. A user 112, such as the one or more relevant parties, may access online platform 100 through a web-based software application or browser. The web-based software application may be embodied as, for example, but not be limited to, a website, a web application, a desktop application, and a mobile application compatible with a computing device 200.

Figure 2:
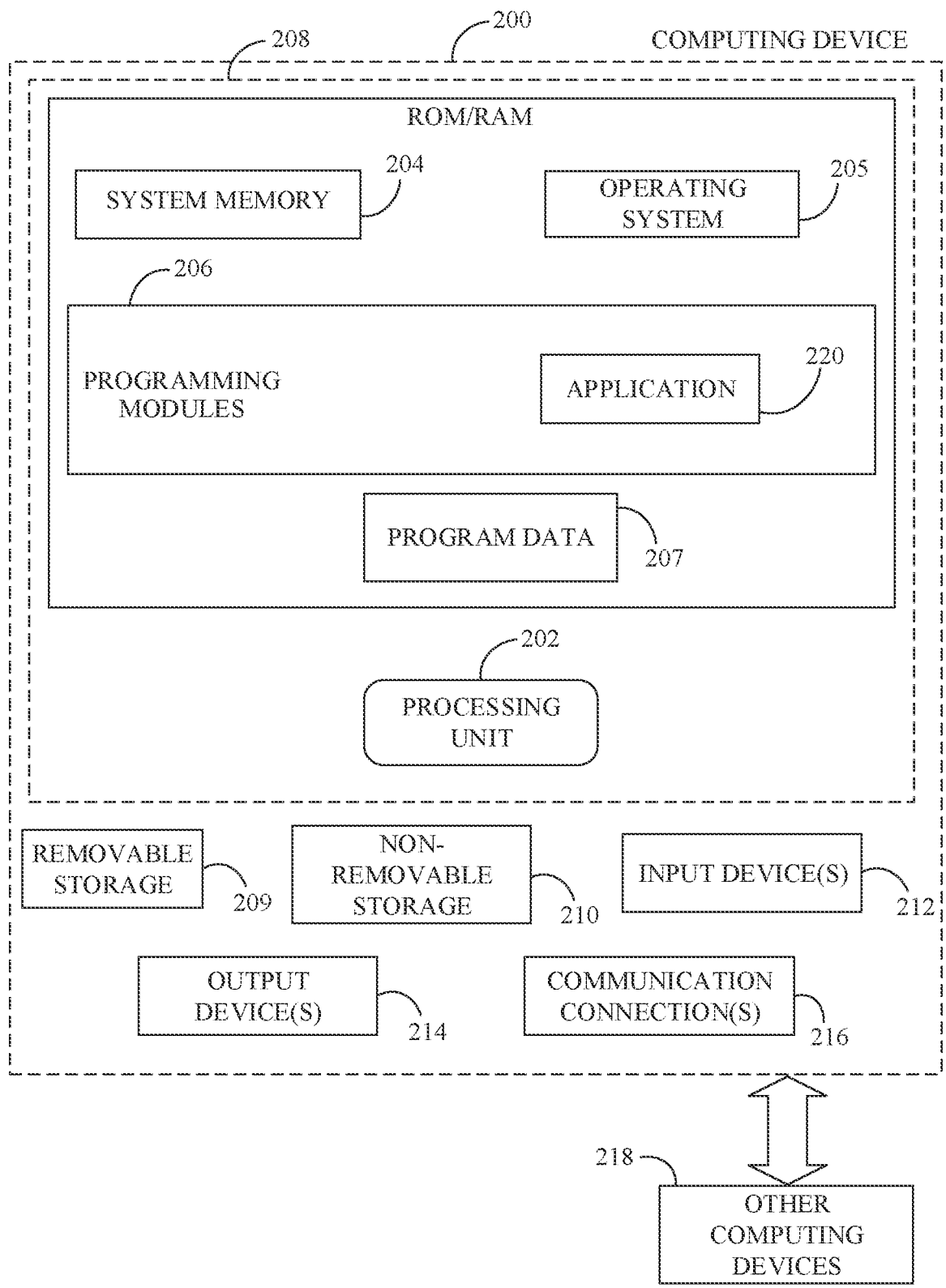
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
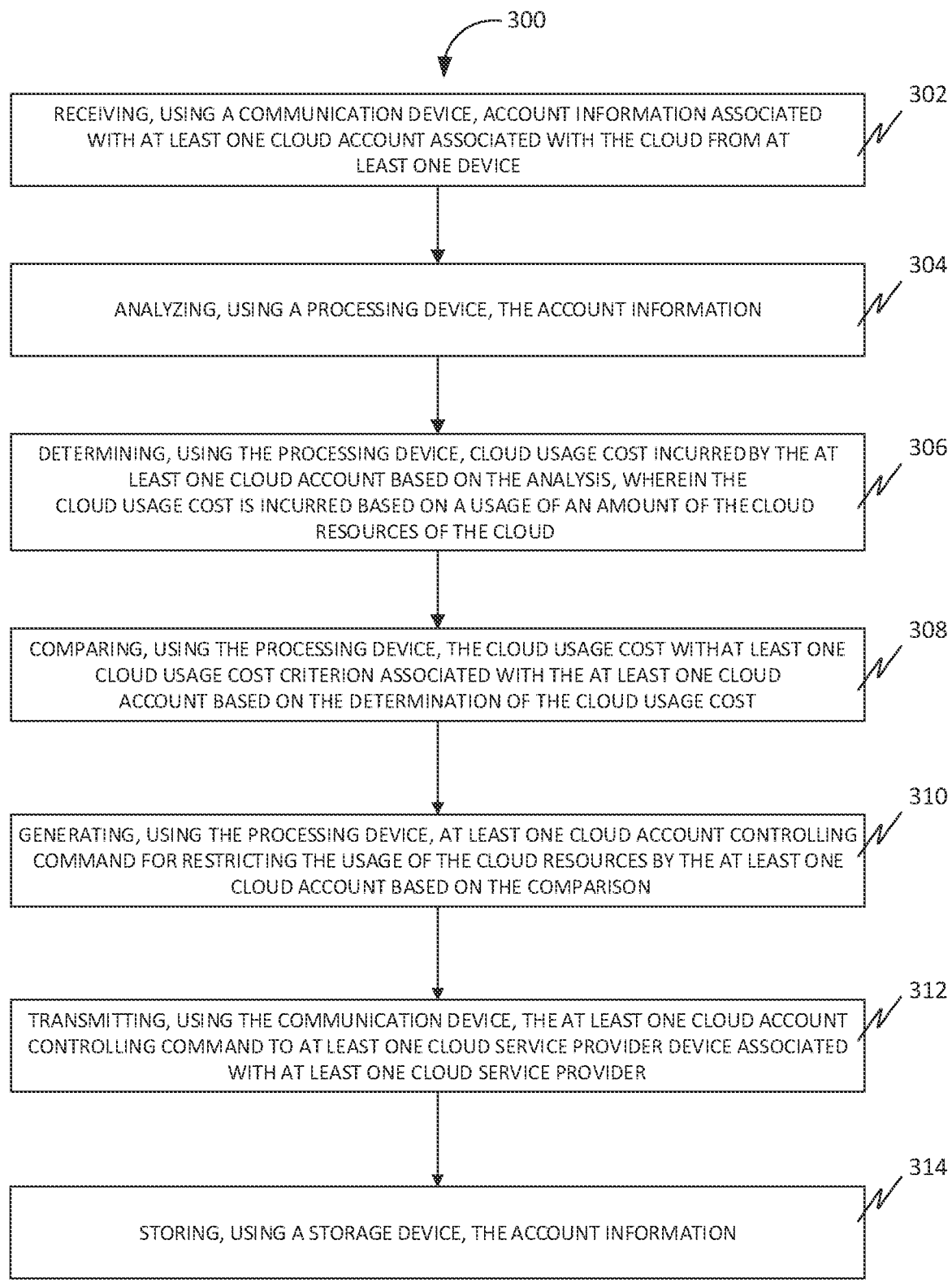
FIG. 3 is a flow chart of a method for facilitating controlling and managing cloud usage costs incurred by cloud accounts for using cloud resources of a cloud server, in accordance with some embodiments.

FIG. 3 is a flow chart of a method 300 for facilitating controlling and managing cloud usage costs incurred by cloud accounts for using cloud resources of a cloud, in accordance with some embodiments. The method 300 may include a step 302 of receiving, using a communication device (such as a communication device 1002), account information associated with one or more cloud accounts associated with the cloud from one or more devices. Further, the account information may include cloud resources usage information associated with a usage of the cloud resources by the one or more cloud accounts. The method 300 may include a step 304 of analyzing, using a processing device (such as a processing device 1004), the account information. Further, the method 300 may include a step 306 of determining, using the processing device, cloud usage cost incurred by the one or more cloud accounts based on the calculation. Further, the cloud usage cost is incurred based on the usage of the cloud resources of the cloud.

Further, the method 300 may include a step 308 of comparing, using the processing device, the cloud usage cost with cloud usage cost criterion associated with the one or more cloud accounts based on the calculation of the cloud usage cost. The method 300 may include a step 310 of generating, using the processing device, one or more cloud account controlling commands for restricting the usage of the cloud resources by the one or more cloud accounts based on the comparison. Further, the method 300 may include a step 312 of transmitting, using the communication device, the one or more cloud account controlling commands to one or more cloud service provider devices associated with the cloud service provider. Further, the one or more service provider devices restrict the usage of the cloud resources by the one or more cloud accounts based on the at least one cloud account controlling commands. Further, the method 300 may include a step 314 of storing, using a storage device (such as a storage device 1006), the account information.

In some embodiments, the restricting may include stopping the one or more cloud accounts from using additional amounts of the cloud resources during a second time period. The restricting may include initiating additional amounts of the cloud resources for the one or more cloud accounts during the second time period. The restricting may include terminating portions of the additional amounts of the cloud resource used by the one or more cloud accounts during the second time period. Further, the one or more cloud usage cost criterions may include one or more cloud usage cost endpoints. Further, the method 300 may include receiving, using the communication device, the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generating of the one or more cloud account controlling commands for the restricting of the usage of the cloud resources by the one or more cloud accounts is based on the comparing of the cloud usage cost with the one or more cloud usage cost endpoints.

Figure 4:
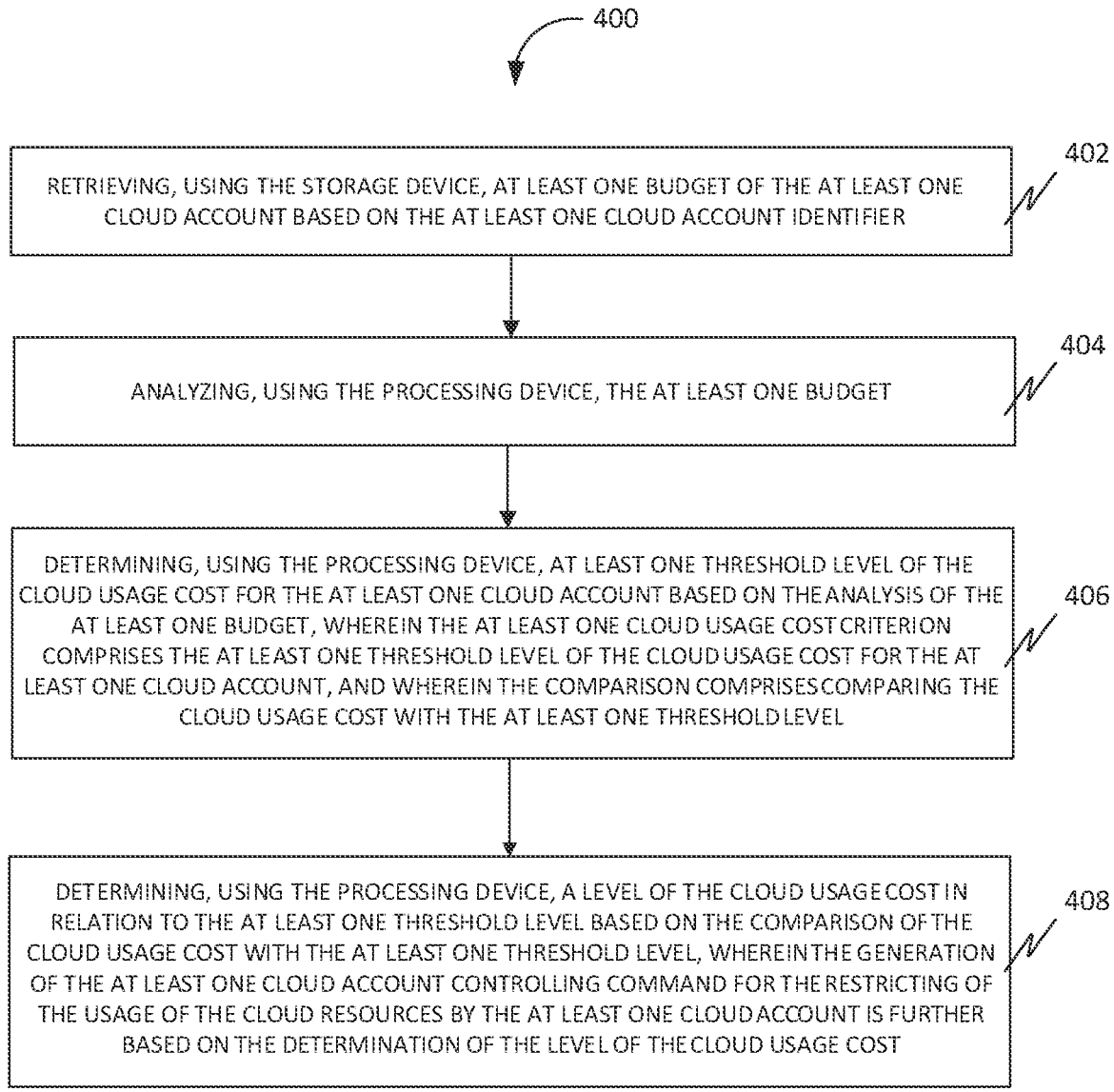
FIG. 4 is a flow chart of a method for facilitating controlling and managing cloud usage costs incurred by cloud accounts for using cloud resources of a cloud server in which the method may include determining a level of the cloud usage cost in relation to one or more threshold levels, in accordance with some embodiments.

FIG. 4 is a flow chart of a method 400 for facilitating controlling and managing cloud usage costs incurred by cloud accounts for using cloud resources of a cloud. The method 400 may include determining a level of the cloud usage cost in relation to one or more threshold levels, in accordance with some embodiments. Further, the account information may include one or more cloud account identifiers of the one or more cloud accounts. Further, at 402, the method 400 may include retrieving, using the storage device, one or more budgets of the one or more cloud accounts based on the one or more cloud account identifiers. Further, at 404, the method 400 may include analyzing, using the processing device, the one or more budgets. Further, at 406, the method 400 may include determining, using the processing device, one or more threshold levels of the cloud usage cost for the one or more cloud accounts based on the analysis of the one or more budgets. The one or more cloud usage cost criterions may include the one or more threshold levels of the cloud usage cost for the one or more cloud accounts. Further, the comparison may include comparing the cloud usage cost with the one or more threshold levels. Further, at 408, the method 400 may include determining, using the processing device, a level of the cloud usage cost in relation to the one or more threshold levels based on the comparison of the cloud usage cost with the one or more threshold levels. Further, the generating of the one or more cloud account controlling commands for the restricting of the usage of the cloud resources by the one or more cloud accounts is based on the determining of the level of the cloud usage cost.

Figure 5:
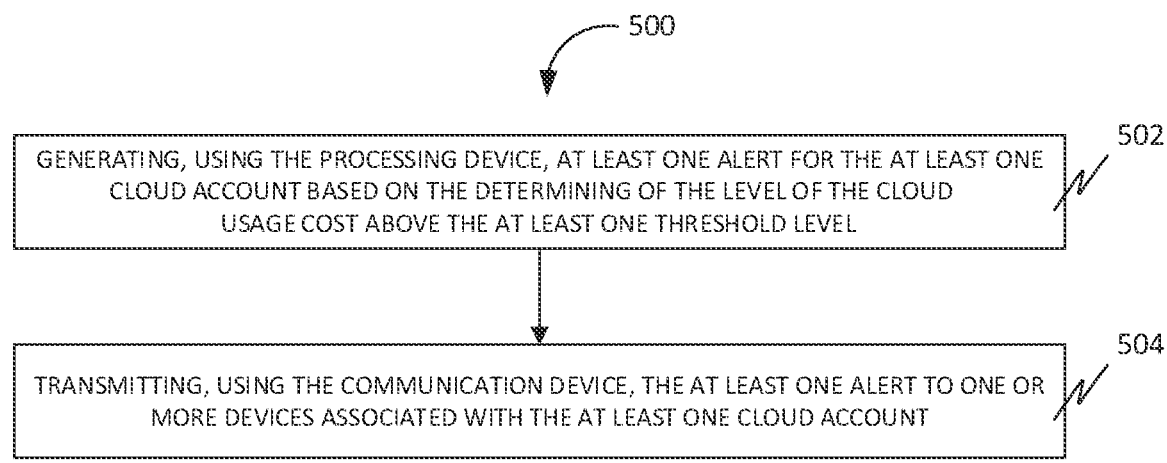
FIG. 5 is a flow chart of the method for facilitating controlling and managing cloud usage costs incurred by cloud accounts for using cloud resources of a cloud server in which the method may include transmitting the one or more alerts to one or more devices associated with the one or more cloud accounts, in accordance with some embodiments.

FIG. 5 is a flow chart of a method 500 for facilitating controlling and managing cloud usage costs incurred by cloud accounts for using cloud resources of a cloud. The method 500 may include transmitting the one or more alerts to one or more devices associated with the one or more cloud accounts, in accordance with some embodiments. Further, at 502, the method 500 may include generating, using the processing device, one or more alerts for the one or more cloud accounts based on the determination of the level of the cloud usage cost above the one or more threshold levels. Further, at 504, the method 500 may include transmitting, using the communication device, the one or more alerts to one or more devices associated with the one or more cloud accounts.

In some embodiments, the one or more threshold levels may include two or more threshold levels. Further, the determination of the level of the cloud usage cost above the one or more threshold levels may include determining the level of the cloud usage cost above a threshold level of the two or more threshold levels. Further, the generating of the one or more alerts may include generating an alert from two or more alerts for the one or more cloud accounts based on the determination of the level of the cloud usage cost above the threshold level of the two or more threshold levels.

Figure 6:
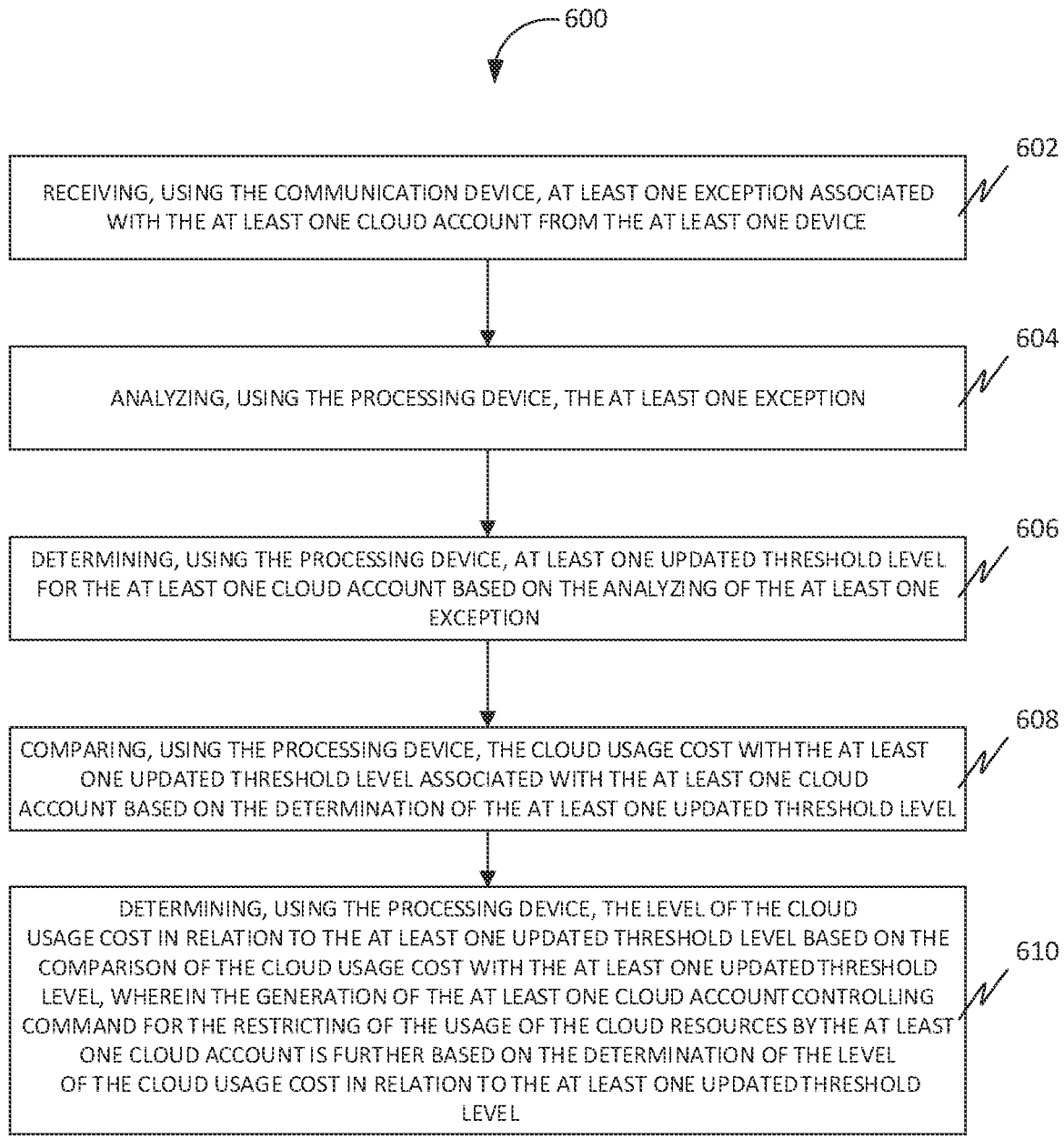
FIG. 6 is a flow chart of a method for facilitating controlling and managing cloud usage costs incurred by cloud accounts for using cloud resources of a cloud server in which the method may include determining the level of the cloud usage cost, in accordance with some embodiments.

FIG. 6 is a flow chart of a method 600 for facilitating controlling and managing cloud usage costs incurred by cloud accounts for using cloud resources of a cloud. The method 600 may include determining the level of the cloud usage cost, in accordance with some embodiments. Further, the method 600 may include a step 602 of receiving, using the communication device, one or more exceptions associated with the one or more cloud accounts from the one or more devices. The method 600 may include a step 604 of analyzing, using the processing device, the one or more exceptions. Further, the method 600 may include a step 606 of determining, using the processing device, one or more updated threshold levels for the one or more cloud accounts based on the analysis of the one or more exceptions.

Further, the method 600 may include a step 608 of comparing, using the processing device, the cloud usage cost with the one or more updated threshold levels associated with the one or more cloud accounts based on the determination of the one or more updated threshold levels. Further, the method 600 may include a step 610 of determining, using the processing device, the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts is further based on the determination of the level of the cloud usage cost in relation to the one or more updated threshold levels.

Figure 7:
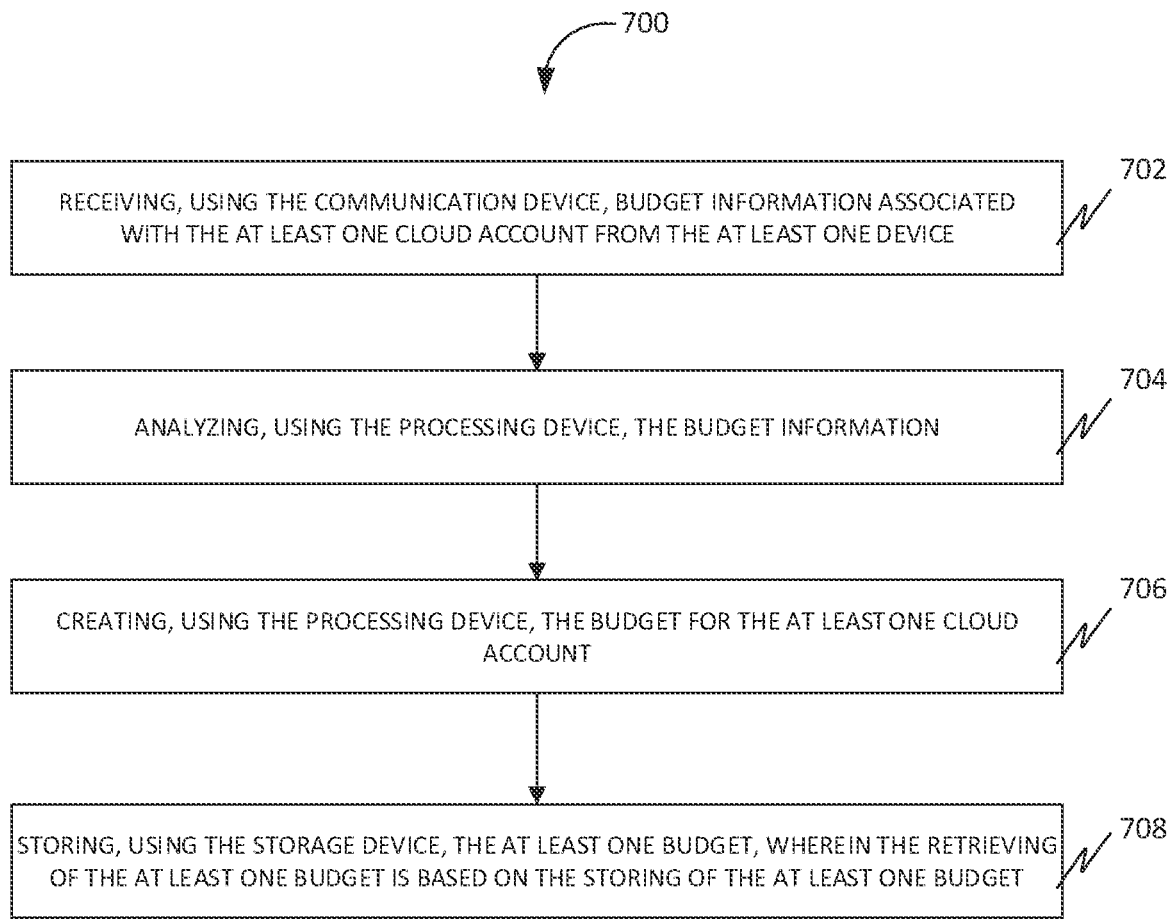
FIG. 7 is a flow chart of a method for facilitating controlling and managing cloud usage costs incurred by cloud accounts for using cloud resources of a cloud server in which the method may include creating the budget for the one or more cloud accounts, in accordance with some embodiments.

FIG. 7 is a flow chart of a method 700 for facilitating controlling and managing cloud usage costs incurred by cloud accounts for using cloud resources of a cloud. The method 700 may include creating the one or more budgets for the one or more cloud accounts, in accordance with some embodiments. Further, the method 700 may include a step 702 of receiving, using the communication device, budget information associated with the one or more cloud accounts from the one or more devices. The method 700 may include a step 704 of analyzing, using the processing device, the budget information. Further, the method 700 may include a step 706 of creating, using the processing device, the one or more budgets for the one or more cloud accounts. The method 700 may include a step 708 of storing, using the storage device, the one or more budgets. Further, the retrieving of the one or more budgets is based on the storing of the one or more budgets. Further, in some embodiments, the receiving of the budget information may include receiving the budget information from one or more budget planning interfaces of the one or more devices.

Further, in some embodiments, the one or more budget information may include one or more historical budgets of the one or more cloud accounts. Further, the analysis of the budget information may include analyzing the one or more historical budgets. Further, the creation of the one or more budgets is based on the analysis of the one or more historical budgets. Further, in some embodiments, the budget information may include historical cloud usage cost incurred by the one or more cloud accounts. Further, the analysis of the budget information may include analyzing the historical cloud usage cost using one or more ML algorithms. Further, the creation of the one or more budgets is based on the analyzing of the historical cloud usage cost.

Figure 8:
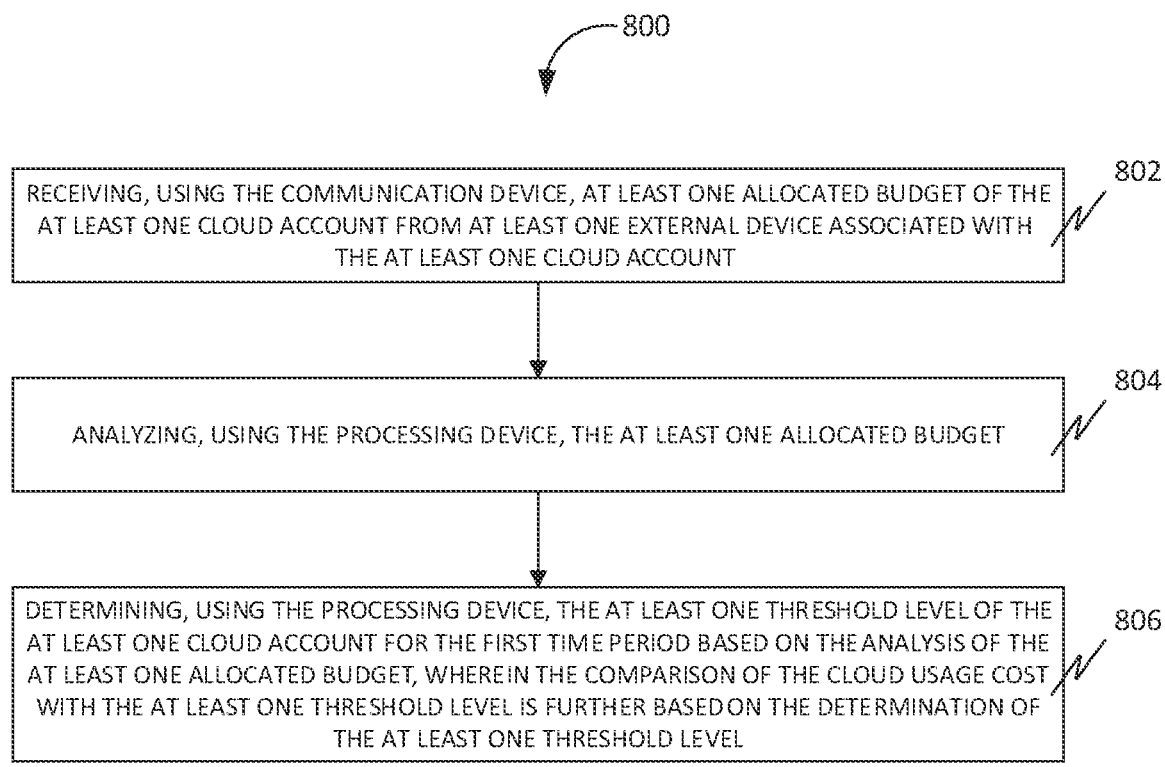
FIG. 8 is a flow chart of a method for facilitating controlling and managing cloud usage costs incurred by cloud accounts for using cloud resources of a cloud server in which the method may include determining the one or more threshold levels of the one or more cloud accounts, in accordance with some embodiments.

FIG. 8 is a flow chart of a method 800 for facilitating controlling and managing cloud usage costs incurred by cloud accounts for using cloud resources of a cloud. The method 800 may include determining the one or more threshold levels of the one or more cloud accounts, in accordance with some embodiments. Further, the method 800 may include a step 802 of receiving, using the communication device, one or more allocated budgets of the one or more cloud accounts from one or more external device associated with the one or more cloud accounts. The method 800 may include a step 804 of analyzing, using the processing device, the one or more allocated budgets. Further, the method 800 may include a step 806 of determining, using the processing device, the one or more threshold levels of the one or more cloud accounts for the first time period based on the analyzing of the one or more allocated budgets. Further, the comparing of the cloud usage cost with the one or more threshold levels may be based on the determination of the one or more threshold levels.

Figure 9:
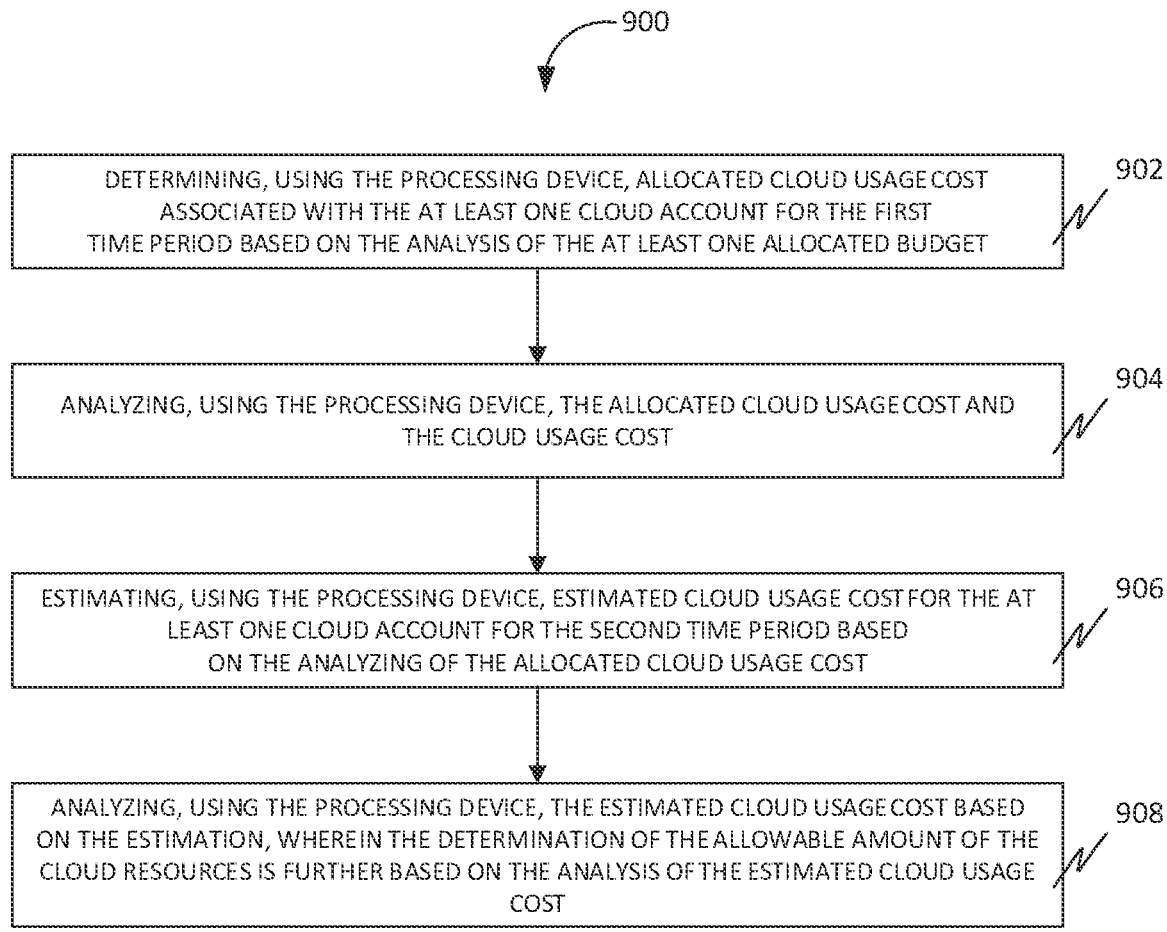
FIG. 9 is a flow chart of a method for facilitating controlling and managing cloud usage costs incurred by cloud accounts for using cloud resources of a cloud server in which the method may include analyzing the estimated cloud usage cost, in accordance with some embodiments.

FIG. 9 is a flow chart of a method 900 for facilitating controlling and managing cloud usage costs incurred by cloud accounts for using cloud resources of a cloud in which the method 900 may include analyzing the one or more estimated cloud usage cost, in accordance with some embodiments. Further, the method 900 may include a step 902 of determining, using the processing device, one or more allocated cloud usage cost associated with the one or more cloud account for the one or more first time period based on the analyzing of the one or more allocated budget. Further, the method 900 may include a step 904 of analyzing, using the processing device, the allocated cloud usage cost and the cloud usage cost. The method 900 may include a step 906 of estimating, using the processing device, estimated cloud usage cost for the one or more cloud accounts for a second time period based on the analysis of the allocated cloud usage cost. Further, the method 900 may include a step 908 of analyzing, using the processing device, the estimated cloud usage cost based on the estimation. Further, the determination of the allowable amount of the cloud resources may be based on the analysis of the estimated cloud usage cost.

Figure 10:
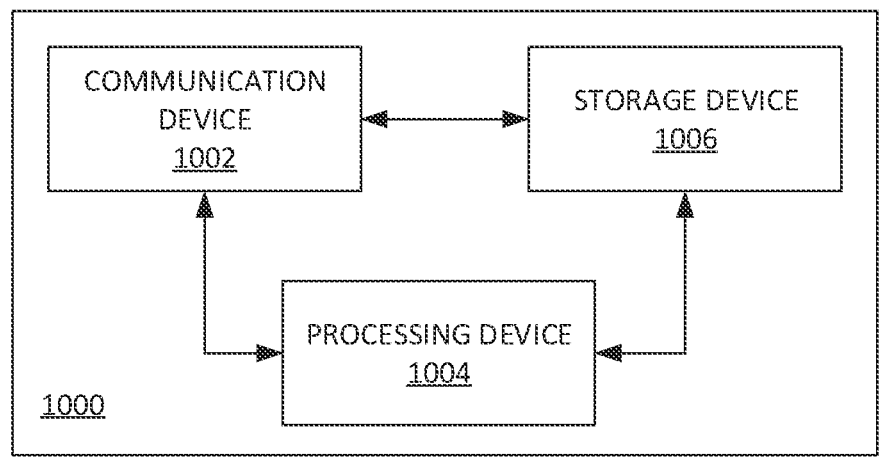
FIG. 10 is a block diagram of a system for facilitating controlling and managing cloud usage costs incurred by cloud accounts for using cloud resources of a cloud server, in accordance with some embodiments.

FIG. 10 is a block diagram of a system 1000 for facilitating controlling and managing cloud usage costs incurred by cloud accounts for using cloud resources of a cloud, in accordance with some embodiments. The system 1000 may include a communication device 1002, a processing device 1004, and a storage device 1006. The communication device 1002 may be configured for performing a step of receiving account information associated with one or more cloud accounts associated with the cloud from one or more devices. Further, the account information may include cloud resources usage information associated with a usage of the cloud resources by the one or more cloud accounts. The communication device 1002 may be configured for performing a step of transmitting one or more cloud account controlling commands to one or more cloud service provider devices associated with one or more cloud service providers. Further, the one or more service provider devices restrict the usage of the cloud resources by the one or more cloud accounts based on the one or more cloud account controlling commands. The processing device 1004 may be communicatively coupled with the communication device 1002.

Further, the processing device 1004 may be configured for performing a step of analyzing the account information. The processing device 1004 may be configured for performing a step of determining cloud usage cost incurred by the one or more cloud accounts based on the analysis. Further, the cloud usage cost may be incurred based on the usage of one or more amounts of the cloud resources of the cloud. The processing device 1004 may be configured for performing a step of comparing the cloud usage cost with one or more cloud usage cost criterions associated with the one or more cloud accounts based on the determining of the cloud usage cost. Further, the processing device 1004 may be configured for performing a step of generating the one or more cloud account controlling commands for restricting the usage of the cloud resources by the one or more cloud accounts based on the comparison. The storage device 1006 may be communicatively coupled with the processing device 1004.

Further, the storage device 1006 may be configured for performing a step of storing the account information. The account information may include one or more cloud account identifiers of the one or more cloud accounts. Further, the storage device 1006 may be configured for retrieving one or more budgets of the one or more cloud accounts based on the one or more cloud account identifiers. Further, the processing device 1004 may be configured for analyzing the one or more budgets. The processing device 1004 may be configured for determining one or more threshold levels of the cloud usage cost for the one or more cloud accounts based on the analysis of the one or more budgets. Further, the one or more cloud usage cost criterions may include the one or more threshold levels of the cloud usage cost for the one or more cloud accounts. Further, the comparison may include comparing the cloud usage cost with the one or more threshold levels. Further, the processing device 1004 may be configured for determining a level of the cloud usage cost in relation to the one or more threshold levels based on the comparison of the cloud usage cost with the one or more threshold levels. Further, the generation of the one or more cloud account controlling commands for the restricting of the usage of the cloud resources by the one or more cloud accounts may be based on the determination of the level of the cloud usage cost.

Further, in some embodiments, the communication device 1002 may be configured for receiving budget information associated with the one or more cloud accounts from the one or more devices. The processing device 1004 may be configured analyzing the budget information. Further, the processing device 1004 may be configured for creating the one or more budgets for the one or more cloud accounts. The storage device 1006 may be configured for storing the one or more budgets. Further, the retrieving of the one or more budgets may be based on the storing of the one or more budgets. Further, in an embodiment, the receiving of the budget information may include receiving the budget information from one or more budget planning interfaces of the one or more devices.

Further, in an embodiment, the budget information may include one or more historical budgets of the one or more cloud accounts. The analysis of the budget information may include analyzing the one or more historical budgets. Further, the creation of the one or more budgets may be based on the analysis of the one or more historical budgets. In an embodiment, the budget information may include historical cloud usage cost incurred by the one or more cloud accounts. Further, the analysis of the budget information may include analyzing the historical cloud usage cost using one or more ML algorithms. Further, the creation of the one or more budgets may be based on the analysis of the historical cloud usage cost.

Further, in some embodiments, the one or more cloud usage cost criterions may include one or more cloud usage cost endpoints. The communication device 1002 may be configured for receiving the one or more cloud usage cost endpoints associated with the one or more cloud accounts from one or more external devices. Further, the comparison of the cloud usage cost with the one or more cloud usage cost criterions may include comparing the cloud usage cost with the one or more cloud usage cost endpoints. Further, the generation of the one or more cloud account controlling commands for the restricting of the usage of the cloud resources by the one or more cloud accounts may be further based on the comparison of the cloud usage cost with the one or more cloud usage cost endpoints. In some embodiments, the restriction may include stopping the one or more cloud accounts from using additional amounts of the cloud resources during the second time period. In some embodiments, the restriction may include initiating additional amounts of the cloud resource for the one or more cloud accounts during the second time period. In some embodiments, the restriction may include terminating one or more portions of the amounts of the cloud resource used by the one or more cloud accounts during the second time period.

In some embodiments, the processing device 1004 may be configured for performing a step of generating one or more alerts for the one or more cloud accounts based on the determination of the level of the cloud usage cost above the one or more threshold levels. Further, the communication device 1002 may be configured for performing a step of transmitting the one or more alerts to one or more devices associated with the one or more cloud accounts. In some embodiments, the one or more threshold levels may include two or more threshold levels. Further, the determining of the level of the cloud usage cost above the one or more threshold levels may include determining the level of the cloud usage cost above a threshold level of the two or more threshold levels. Further, the generation of the one or more alerts may include generating an alert from two or more alerts for the one or more cloud accounts based on the determination of the level of the cloud usage cost above the threshold level of the two or more threshold levels.

In some embodiments, the communication device 1002 may be configured for performing a step of receiving one or more exceptions associated with the one or more cloud accounts from the one or more devices. The processing device 1004 may be configured for performing a step of analyzing the one or more exceptions. Further, the processing device 1004 may be configured for performing a step of determining one or more updated threshold levels for the one or more cloud accounts based on the analysis of the one or more exceptions. The processing device 1004 may be configured for performing a step of comparing the cloud usage cost with the one or more updated threshold levels associated with the one or more cloud accounts based on the determination of the one or more updated threshold levels. Further, the processing device 1004 may be configured for performing a step of determining the level of the cloud usage cost in relation to the one or more updated threshold levels based on the comparison of the cloud usage cost with the one or more updated threshold levels. Further, the generating of the one or more cloud account controlling commands for the restricting of the usage of the cloud resources by the one or more cloud accounts may be further based on the determining of the level of the cloud usage cost in relation to the one or more updated threshold levels.

In some embodiments, the communication device 1002 may be configured for performing a step of receiving historical cloud usage data associated with the one or more cloud accounts from one or more external devices associated with the one or more cloud accounts. Further, the processing device 1004 may be configured for performing a step of analyzing the historical cloud usage data using one or more ML algorithms. The processing device 1004 may be configured for performing a step of estimating one or more budgets of the one or more cloud accounts for the first time period based on the analysis of the historical cloud usage data. Further, the processing device 1004 may be configured for performing a step of determining the one or more threshold levels of the one or more cloud accounts for the first time period based on the one or more budgets. Further, the comparison of the cloud usage cost with the one or more threshold levels may be based on the determination of the one or more threshold levels.

In some embodiments, the communication device 1002 may be configured for performing a step of receiving one or more allocated budgets of the one or more cloud accounts from one or more external devices associated with the one or more cloud accounts. Further, the processing device 1004 may be configured for performing a step of analyzing the one or more allocated budgets. Further, the processing device 1004 may be configured for performing a step of determining the one or more threshold levels of the one or more cloud accounts for the first time period based on the analysis of the one or more allocated budgets. Further, the comparing of the cloud usage cost with the one or more threshold levels may be based on the determining of the one or more threshold levels.

In some embodiments, the processing device 1004 may be configured for performing a step of determining allocated cloud usage cost associated with the one or more cloud accounts for the first time period based on the analysis of the allocated budget. Further, the processing device 1004 may be configured for performing a step of analyzing the allocated cloud usage cost and the cloud usage cost. Further, the processing device 1004 may be configured for performing a step of estimating estimated cloud usage cost for the one or more cloud accounts for the second time period based on the analysis of the allocated cloud usage cost. Further, the processing device 1004 may be configured for performing a step of analyzing the estimated cloud usage cost based on the estimation. Further, the determination of the allowable amount of the cloud resources may be based on the analyzing of the estimated cloud usage cost.

Figure 11:
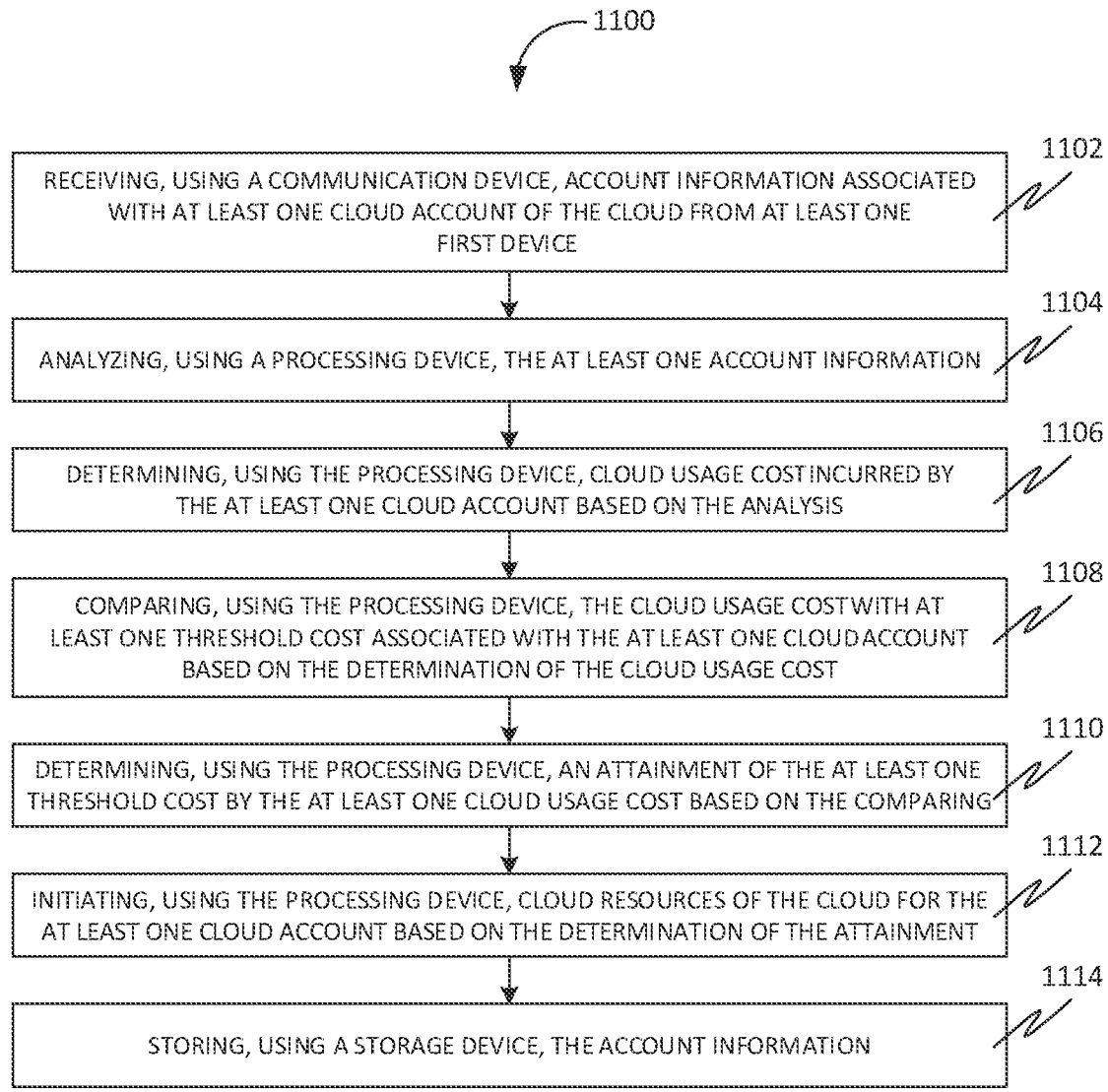
FIG. 11 is a flowchart of a method for facilitating, controlling, and managing cloud usage costs incurred by cloud accounts of a cloud server, in accordance with some embodiments.

FIG. 11 is a flowchart of a method 1100 for facilitating controlling and managing cloud usage costs incurred by cloud accounts of a cloud, in accordance with some embodiments. Accordingly, the method 1100 may include a step 1102 of receiving, using a communication device, account information associated with at least one cloud account of the cloud from at least one first device. Further, the method 1100 may include a step 1104 of analyzing, using a processing device, the account information. The method 1100 may include a step 1106 of determining, using the processing device, the cloud usage cost incurred by the cloud account based on the analysis. Further, the method 1100 may include a step 1108 of comparing, using the processing device, the cloud usage cost with at least one threshold cost associated with the cloud account based on the determination of the cloud usage cost. The method 1100 may include a step 1110 of determining, using the processing device, an attainment of the at least one threshold cost by the cloud usage cost based on the comparison. Further, the method 1100 may include a step 1112 of initiating, using the processing device, cloud resources of the cloud for the cloud account based on the determination of the attainment. The cloud resources may not be initiated for the cloud account if the cloud usage cost attains the at least one threshold cost. Further, the cloud resources may be initiated for the cloud account if the cloud usage cost does not attain the at least one threshold cost. The method 1100 may include a step 1114 of storing, using a storage device, the account information.

Figure 12:
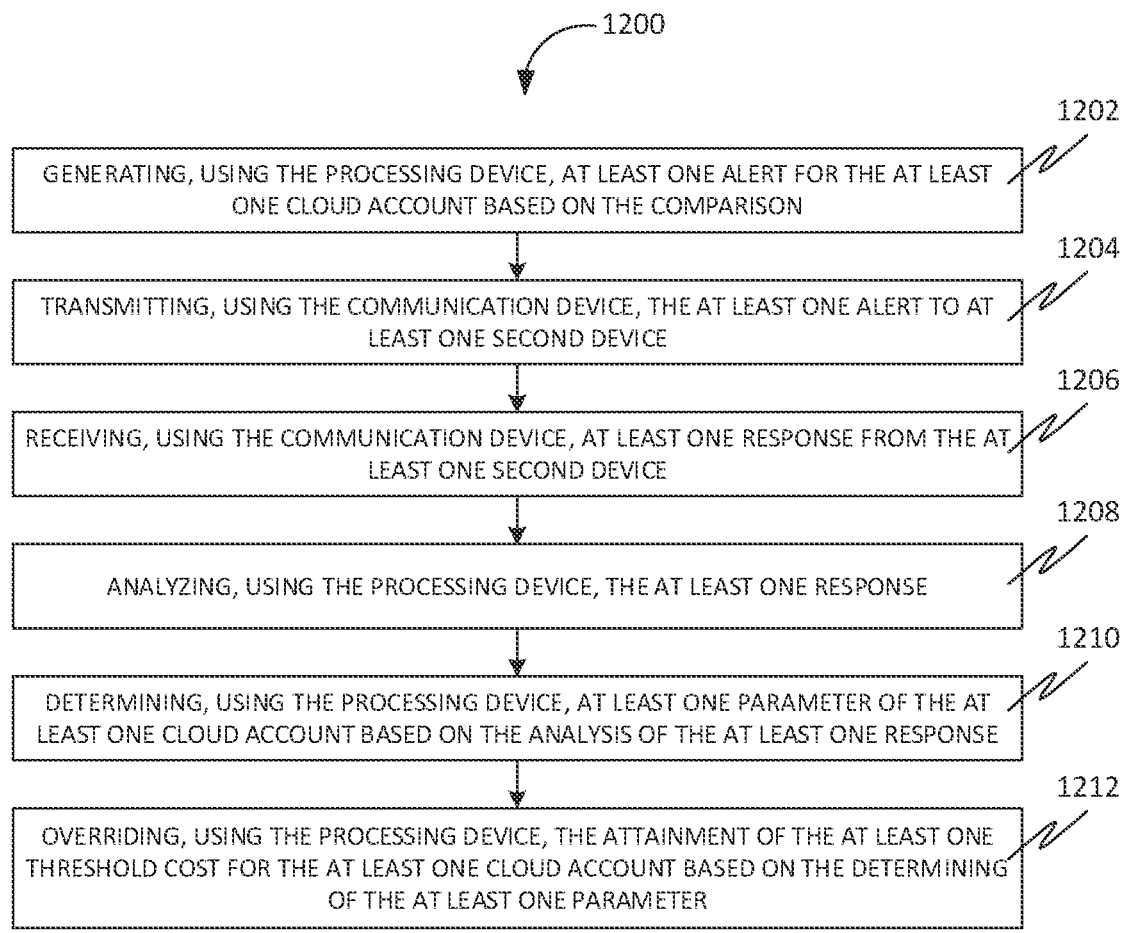
FIG. 12 is a flowchart of a method for facilitating overriding the attainment of the threshold cost by the at least one cloud usage cost, in accordance with some embodiments.
Figure 13:
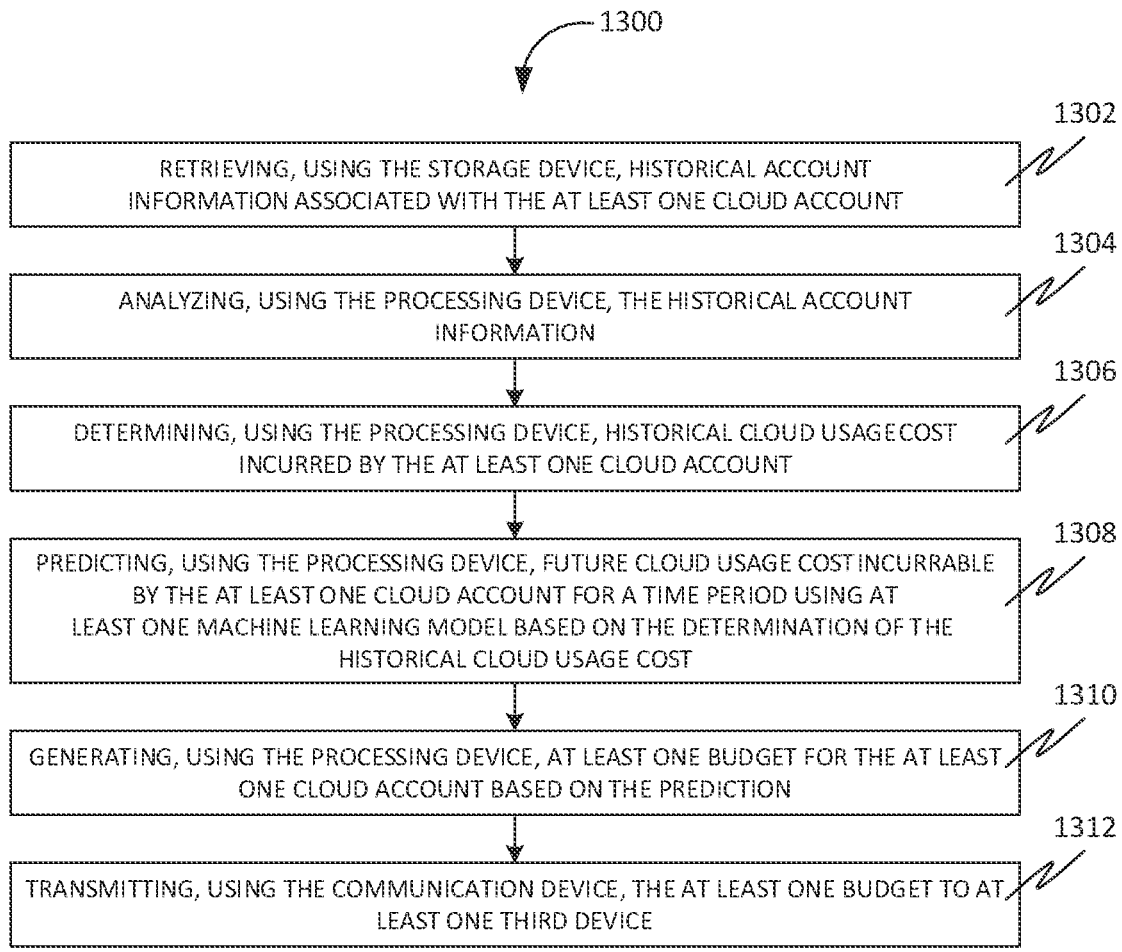
FIG. 13 is a flowchart of a method for estimating budgets for the cloud accounts of the cloud server, in accordance with some embodiments.

FIG. 12 is a flowchart of a method 1200 for facilitating overriding the attainment of the at least one threshold cost by the cloud usage cost, in accordance with some embodiments. Accordingly, the method 1200 may include a step 1202 of generating, using the processing device, at least one alert for the one cloud account based on the comparison. Further, the method 1200 may include a step 1204 of transmitting, using the communication device, the at least one alert to at least one second device. The method 1200 may include a step 1206 of receiving, using the communication device, at least one response from the at least one second device. Further, the method 1200 may include a step 1208 of analyzing, using the processing device, the at least one response. The method 1200 may include a step 1210 of determining, using the processing device, at least one parameter of the cloud account based on the analysis of the at least one response. Further, the method 1200 may include a step 1212 of overriding, using the processing device, the attainment of the at least one threshold cost for the cloud account based on the determination of the at least one parameter. Further, the initiating of the cloud resources for the cloud account may be based on the overriding.

Figure 16:
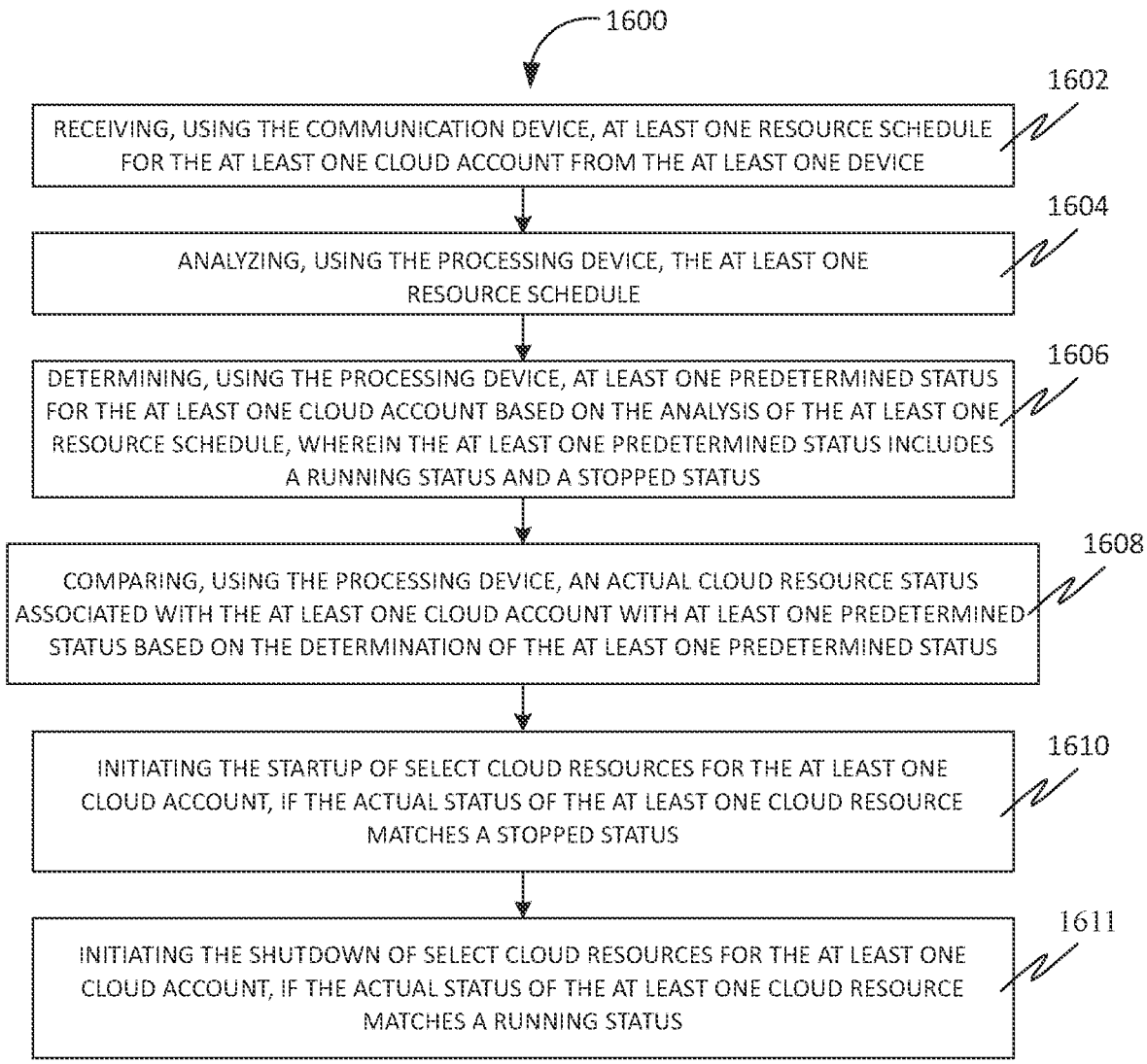
FIG. 16 is a flowchart of a method for dynamically terminating cloud resources when the cloud resources are not in use, in accordance with some embodiments.

FIG. 16 is a flowchart of a method 1600 for dynamically stopping cloud resources when the cloud resources are not in use, in accordance with some embodiments. Accordingly, the method 1600 may include a step 1602 of receiving, using the communication device, at least one resource schedule for the at least one cloud account from the at least one device. The method 1600 may include a step 1604 of analyzing, using the processing device, the at least one resource schedule. Further, the method 1600 may include a step 1606 of determining, using the processing device, at least one predetermined status for the at least one cloud account based on the analysis of the at least one resource schedule, wherein the at least one predetermined status includes a running status and a stopped status. The method 1600 may include a step 1608 of comparing, using the processing device, an actual cloud resource status associated with the at least one cloud account with at least one predetermined status based on the determination of the at least one predetermined status. In addition, the method 1600 may include a step 1610 of initiating the startup of select cloud resources for the at least one cloud account, if the actual status of the at least one cloud resource matches a stopped status. Alternatively, the method 1600 may also include a step 1611 of initiating the shutdown of select cloud resources for the at least one cloud account, if the actual status of the at least one cloud resource matches a running status.

In the preferred embodiment, the at least one resource schedule may correspond to predetermined working hours associated with the at least one cloud account, wherein the running status corresponds to working hours within the range of the predetermined working hours, and wherein the stopped status corresponds to non-working hours outside the range of the predetermined working hours. In other words, if the cloud resources are not running during predetermined working hours, the cloud resources can be dynamically started if the cloud resources have not been manually started. If the cloud resources are running during predetermined non-working hours, the cloud resources can be dynamically stopped to save cloud usage cost if the cloud resources are not manually stopped.

In an alternate embodiment, the at least one resource schedule corresponds to predetermined service level requirements (SLAs) associated with the at least one cloud account, wherein the running status corresponds to service levels within the range of SLAs, and wherein the stopped status corresponds to service levels outside the range of SLAs. In other words, if the usage of cloud resources by the cloud account falls within the SLAs, the cloud resources can be dynamically brought up and running if the cloud resources have not been manually started. Further, the cloud resources can be dynamically stopped if the usage of cloud resources by the cloud account falls outside the predetermined SLAs.

Figure 14:
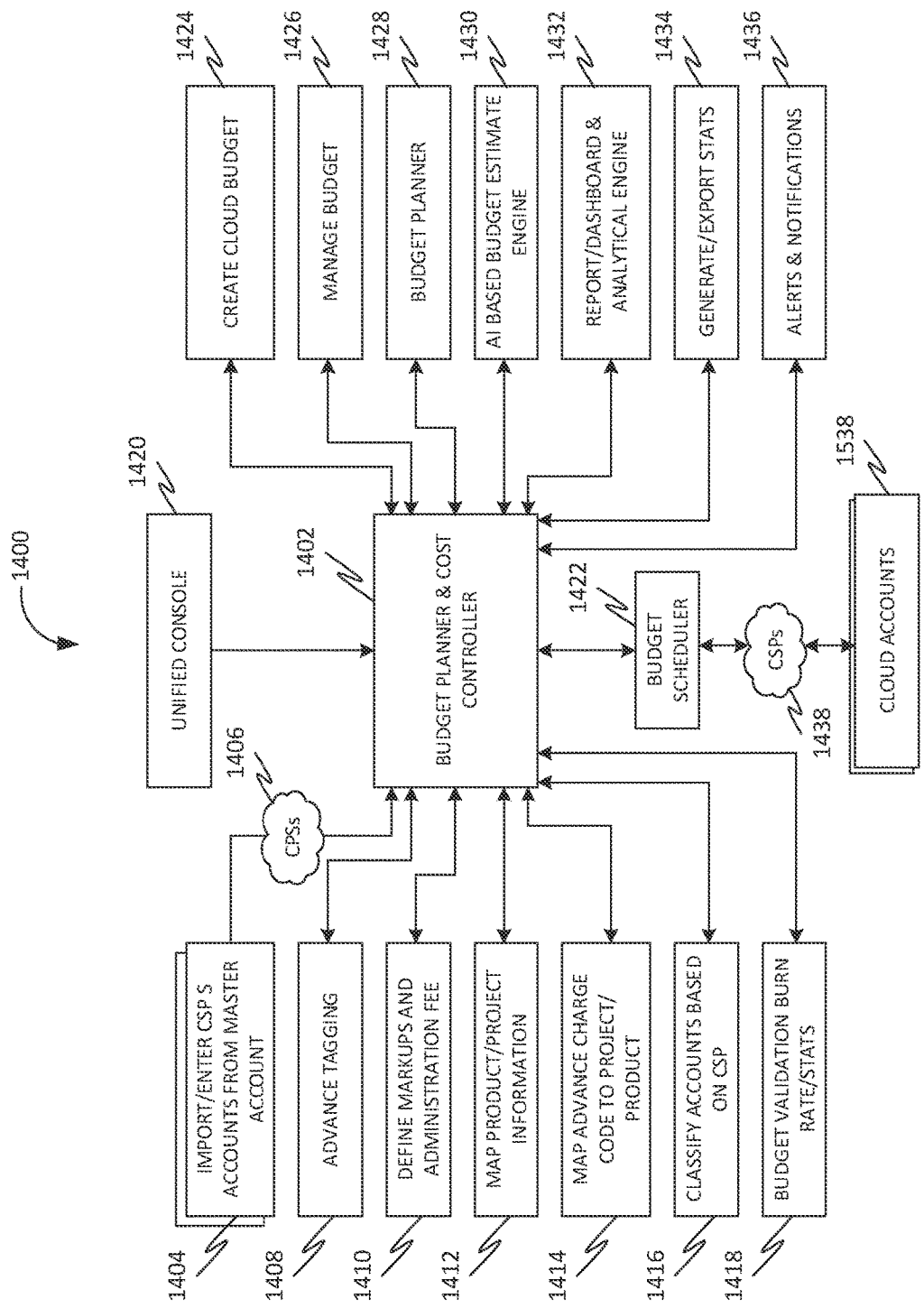
FIG. 14 is a block diagram of a system for creating, manage and planning a budget for any given period or fiscal year across all the accounts in the cloud server, in accordance with some embodiments.

FIG. 14 is a block diagram of a system 1400 for creating, managing, and planning a budget for any given period or fiscal year across all the accounts in the cloud, in accordance with some embodiments. Further, the system 1400 may include a budget planner and cost controller 1402. At 1404, the budget planner and cost controller 1402 imports/enters CSP's accounts from a master account using a CSP 1406. Further, at 1408, the budget planner and cost controller 1402 performs advance tagging. At 1410, the budget planner and cost controller 1402 define markups and administration fees. Further, at 1412, the budget planner and cost controller 1402 maps product/project information. At 1414, the budget planner and cost controller 1402 maps advance charge code to project/product. Further, at 1416, the budget planner and cost controller 1402 classifies accounts based on CSP. Further, at 1418, the budget planner and cost controller 1402 determines budget validation/burn rate/stats. The system 1400 may include a unified console 1420, a budget scheduler 1422, a create cloud budget 1424, a manage budget 1426, a budget planner 1428, an AI based budget estimate engine 1430, a report/dashboard and analytical engine 1432, a generate/export stats 1434, and alerts and notifications 1436. Further, the system 1400 generates a schedule via the budget scheduler 1422 to push the schedule to cloud accounts 1538 using a CSP 1438.

Figure 15:
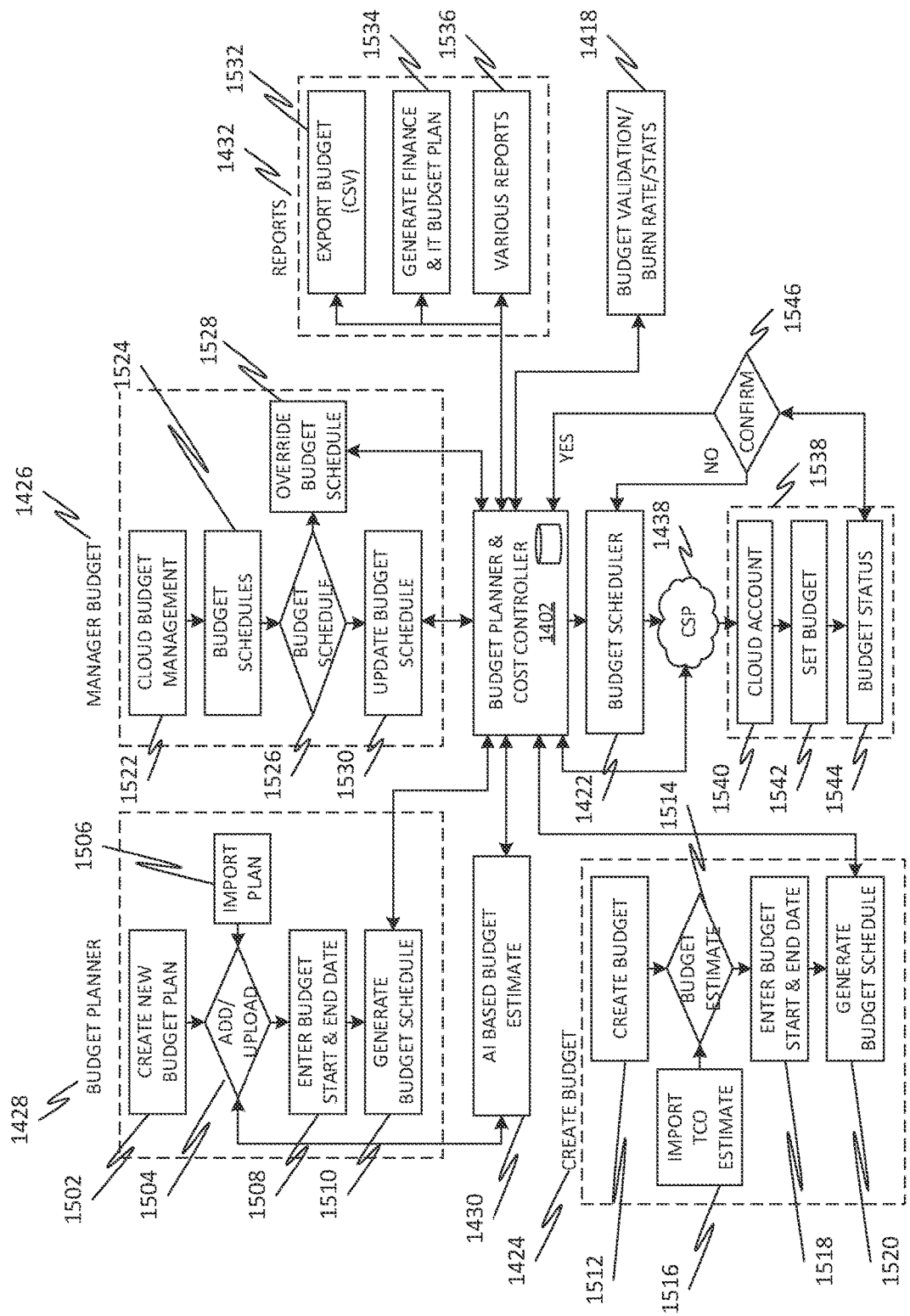
FIG. 15 is a flowchart of methods for creating, managing, and controlling the budget, budget schedules, and budget planning for the cloud accounts across multiple cloud service providers, in accordance with some embodiments.

FIG. 15 is a flow diagram of methods for creating, managing, and controlling the budget, budget schedules, and budget planning for the cloud accounts 1538 across multiple cloud service providers, in accordance with some embodiments. At 1502, the budget planner 1428 may include creating a new budget plan. Further, at 1504, the budget planner 1428 may include adding/uploading based on importing a plan 1506 or from the system generated budget plan from AI-based budget estimate engine 1430. Further, at 1508, the budget planner 1428 may include entering the budget's start and end dates. At 1510, the budget planner 1428 may include generating a budget schedule. Further, the budget planner and cost controller 1402 receives the budget schedule after the step 1510. At 1512, the create cloud budget 1424 may include creating a budget. Further, at 1514, the create cloud budget 1424 may include budget estimation based on importing TCO 1516. Further, at 1518, the create cloud budget 1424 may include entering the budget's start and end dates. Further, at 1520, the create cloud budget 1424 may include generating a budget schedule. Further, the budget planner and cost controller 1402 receives the budget schedule after the step 1520.

Further, at 1522, the managed budget 1426 may include a cloud-based budget management. At 1524, the managed budget 1426 may include budget schedules. Further, at 1526, the managed budget 1426 may include a budget schedule. At 1528, the managed budget 1426 may include overriding the budget schedule based on the budget schedule 1526. Further, at 1530, the managed budget 1426 may include updating the budget schedule based on the budget schedule 1526. Further, the budget planner and cost controller 1402 receives the budget schedule after the step 1530. The budget planner and cost controller 1402 receives the budget schedule after the step 1528. Further, the report 1432 may include export budget (CSV) 1532, generate finance and IT budget plan 1534, and various reports 1536. Further, the cloud accounts 1538 may include cloud account 1540, set budget 1542, and budget status 1544. Further, the budget planner and cost controller 1402 and the budget scheduler 1422 receive the budget status 1544 via a step of 1546.

Although the invention has been explained in relation to its preferred embodiment, it is to be understood that many other possible modifications and variations can be made without departing from the spirit and scope of the invention.

What is claimed is:

1. A method for facilitating the control and management of cloud usage costs incurred by cloud accounts for using cloud resources of a cloud service, the method comprising the steps of:

receiving, using a communication device, account information associated with at least one cloud account associated with the cloud from at least one device, wherein the at least one account information comprises cloud resources usage information associated with a usage of the cloud resources by the at least one cloud account;

analyzing, using a processing device, the account information;

determining, using the processing device, the cloud usage cost incurred by the at least one cloud account based on the analysis, wherein the cloud usage cost is incurred based on the usage of the cloud resources of the cloud;

comparing, using the processing device, the cloud usage cost with at least one cloud usage cost criterion associated with the at least one cloud account;

generating, using the processing device, at least one cloud account controlling command for restricting the usage of the cloud resources by the at least one cloud account based on the comparison;

transmitting, using the communication device, the at least one cloud account controlling command to at least one cloud service provider device associated with at least one cloud service provider, wherein the at least one service provider device restricts the usage of the cloud resources by the at least one cloud account based on the at least one cloud account controlling command;

storing, using a storage device, the account information;

the account information comprises at least one cloud account identifier of the at least one cloud account;

retrieving, using the storage device, at least one budget of the at least one cloud account based on the at least one cloud account identifier;

analyzing, using the processing device, the at least one budget;

determining, using the processing device, at least one threshold level of the cloud usage cost for the at least one cloud account based on the analysis of the at least one budget, wherein the at least one cloud usage cost criterion comprises the at least one threshold level of the cloud usage cost for the at least one cloud account, wherein the comparison comprises comparing the cloud usage cost with the at least one threshold level;

determining, using the processing device, a level of the cloud usage cost in relation to the at least one threshold level based on the comparison of the cloud usage cost with the at least one threshold level, wherein the generation of the at least one cloud account controlling command for the restricting of the usage of the cloud resources by the at least one cloud account is further based on the determining of the level of the cloud usage cost;

receiving, using the communication device, budget information associated with the at least one cloud account from the at least one device;

analyzing, using the processing device, the budget information;

creating, using the processing device, at least one budget for the at least one cloud account;

storing, using the storage device, the at least one budget, wherein the retrieving of the at least one budget is based on the storing of the at least one budget; and the budget information comprises historical cloud usage cost incurred by the at least one cloud account, wherein the analyzing of the budget information comprises analyzing the historical cloud usage cost using at least one machine learning (ML) algorithm, wherein the creating of the at least one budget is further based on the analysis of the historical cloud usage cost.

2. The method of claim 1, wherein the receiving of the budget information comprises receiving the budget information from at least one budget planning interface of the at least one device.

3. The method of claim 1, wherein the budget information comprises at least one historical budget of the at least one cloud account, wherein the analysis of the budget information comprises analyzing the at least one historical budget, and wherein the creation of the at least one budget is further based on the analyzing of the at least one historical budget.

4. The method of claim 1, wherein the at least one cloud usage cost criterion comprises at least one cloud usage cost endpoint, wherein the method further comprises receiving, using the communication device, the at least one cloud usage cost endpoint associated with the at least one cloud account from at least one external device, wherein the comparison of the cloud usage cost with the at least one cloud usage cost criterion comprises comparing the cloud usage cost with the at least one cloud usage cost endpoint, wherein the generation of the at least one cloud account controlling command for the restricting of the usage of the cloud resources by the at least one cloud account is further based on the comparison of the cloud usage cost with the at least one cloud usage cost endpoint.

5. The method of claim 1 further comprising:
generating, using the processing device, at least one alert for the at least one cloud account based on the determining of the level of the cloud usage cost above the at least one threshold level; and
transmitting, using the communication device, the at least one alert to one or more devices associated with the at least one cloud account.

6. The method of claim 5, wherein the at least one threshold level comprises a plurality of threshold levels, wherein the determination of the level of the cloud usage cost above the at least one threshold level comprises determining the level of the cloud usage cost above a threshold level of the plurality of threshold levels, and wherein the generation of the at least one alert comprises generating an alert from a plurality of alerts for the at least one cloud account based on the determining of the level of the cloud usage cost above the threshold level of the plurality of threshold levels.

7. The method of claim 1 further comprising:
receiving, using the communication device, at least one exception for the at least one budget associated with the at least one cloud account from the at least one device;
analyzing, using the processing device, the at least one exception;
determining, using the processing device, at least one updated threshold level for the at least one cloud account based on the analysis of the at least one exception;
comparing, using the processing device, the cloud usage cost with the at least one updated threshold level associated with the at least one cloud account based on the determination of the at least one updated threshold level; and
determining, using the processing device, the level of the cloud usage cost in relation to the at least one updated threshold level based on the comparison of the cloud usage cost with the at least one updated threshold level, wherein the generation of the at least one cloud account controlling command for the restricting of the usage of the cloud resources by the at least one cloud account is further based on the determining of the level of the cloud usage cost in relation to the at least one updated threshold level.

8. The method of claim 1 further comprising:
receiving, using the communication device, at least one resource schedule for the at least one cloud account from the at least one device;
analyzing, using the processing device, the at least one resource schedule;
determining, using the processing device, at least one predetermined status of cloud resource for the at least one cloud account based on the analysis of the at least one resource schedule, wherein the at least one predetermined status includes a running status and a stopped status;

comparing, using the processing device, an actual status of cloud resources associated with the at least one cloud account with at least one predetermined status based on the determination of the at least one predetermined status;

initiating the startup of select cloud resources for the at least one cloud account, if the actual status of the cloud resources matches a stopped status; and initiating the shutdown of select cloud resources for the at least one cloud account, if the actual status of the cloud resources matches a running status.

9. The method of claim 8, wherein the at least one resource schedule corresponds to predetermined working hours associated with the at least one cloud account, wherein the running status corresponds to working hours within the range of the predetermined working hours, and wherein the stopped status corresponds to non-working hours outside the range of the predetermined working hours.

10. The method of claim 8, wherein the at least one resource schedule corresponds to predetermined service level requirements (SLAs) associated with the at least one cloud account, wherein the running status corresponds to service levels within the range of SLAs, and wherein the stopped status corresponds to service levels outside the range of SLAs.

11. A method for facilitating the control and management of cloud usage costs incurred by cloud accounts for using cloud resources of a cloud service, the method comprising the steps of:

receiving, using a communication device, account information associated with at least one cloud account associated with the cloud from at least one device, wherein the account information comprises cloud resources usage information associated with a usage of the cloud resources by the at least one cloud account;

analyzing, using a processing device, the account information;

determining, using the processing device, the cloud usage cost incurred by the at least one cloud account based on the analysis, wherein the cloud usage cost is incurred based on the usage of the cloud resources of the cloud;

comparing, using the processing device, the cloud usage cost with at least one cloud usage cost criterion associated with the at least one cloud account;

generating, using the processing device, at least one cloud account controlling command for restricting the usage of the cloud resources by the at least one cloud account based on the comparison;

transmitting, using the communication device, the at least one cloud account controlling command to at least one cloud service provider device associated with at least one cloud service provider, wherein the at least one service provider device restricts the usage of the cloud resources by the at least one cloud account based on the at least one cloud account controlling command;

storing, using a storage device, the account information;

the account information comprises at least one cloud account identifier of the at least one cloud account;

retrieving, using the storage device, at least one budget of the at least one cloud account based on the at least one cloud account identifier;

analyzing, using the processing device, the at least one budget;

determining, using the processing device, at least one threshold level of the cloud usage cost for the at least one cloud account based on the analysis of the at least one budget, wherein the at least one cloud usage cost criterion comprises the at least one threshold level of the cloud usage cost for the at least one cloud account, wherein the comparison comprises comparing the cloud usage cost with the at least one threshold level;

determining, using the processing device, a level of the cloud usage cost in relation to the at least one threshold level based on the comparison of the cloud usage cost with the at least one threshold level, wherein the generation of the at least one cloud account controlling command for the restricting of the usage of the cloud resources by the at least one cloud account is further based on the determining of the level of the cloud usage cost;

the at least one cloud usage cost criterion comprises at least one cloud usage cost endpoint;

receiving, using the communication device, the at least one cloud usage cost endpoint associated with the at least one cloud account from at least one external device, wherein the comparison of the cloud usage cost with the at least one cloud usage cost criterion comprises comparing the cloud usage cost with the at least one cloud usage cost endpoint, wherein the generation of the at least one cloud account controlling command for the restricting of the usage of the cloud resources by the at least one cloud account is further based on the comparison of the cloud usage cost with the at least one cloud usage cost endpoint;

receiving, using the communication device, budget information associated with the at least one cloud account from the at least one device;

analyzing, using the processing device, the budget information;

creating, using the processing device, the at least one budget for the at least one cloud account;

storing, using the storage device, the at least one budget, wherein the retrieving of the at least one budget is based on the storing of the at least one budget; and the budget information comprises historical cloud usage cost incurred by the at least one cloud account, wherein the analysis of the budget information comprises analyzing the historical cloud usage cost using at least one ML algorithm, wherein the creation of the at least one budget is further based on the analysis of the historical cloud usage cost.

12. The method of claim 11, wherein the receiving of the budget information comprises receiving the budget information from at least one budget planning interface of the at least one device, wherein the budget information comprises at least one historical budget of the at least one cloud account, wherein the analysis of the budget information comprises analyzing the at least one historical budget, wherein the creation of the at least one budget is further based on the analysis of the at least one historical budget.

13. The method of claim 11 further comprising:

generating, using the processing device, at least one alert for the at least one cloud account based on the determination of the level of the cloud usage cost above the at least one threshold level;

transmitting, using the communication device, the at least one alert to one or more devices associated with the at least one cloud account, wherein the at least one threshold level comprises a plurality of threshold levels, wherein the determination of the level of the cloud usage cost above the at least one threshold level comprises determining the level of the cloud usage cost above a threshold level of the plurality of threshold levels, and wherein the generation of the at least one alert comprises generating an alert from a plurality of alerts for the at least one cloud account based on the determination of the level of the cloud usage cost above the threshold level of the plurality of threshold levels.

14. The method of claim 11 further comprising:

receiving, using the communication device, at least one exception for the at least one budget associated with the at least one cloud account from the at least one device;

analyzing, using the processing device, the at least one exception;

determining, using the processing device, at least one updated threshold level for the at least one cloud account based on the analysis of the at least one exception;

comparing, using the processing device, the cloud usage cost with the at least one updated threshold level associated with the at least one cloud account based on the determination of the at least one updated threshold level; and determining, using the processing device, the level of the cloud usage cost in relation to the at least one updated threshold level based on the comparison of the cloud usage cost with the at least one updated threshold level, wherein the generation of the at least one cloud account controlling command for the restricting of the usage of the cloud resources by the at least one cloud account is further based on the determination of the level of the cloud usage cost in relation to the at least one updated threshold level.

* * * * *